United States Patent
Matsuo et al.

(10) Patent No.: US 10,982,692 B2
(45) Date of Patent: Apr. 20, 2021

(54) SWING-BACK PREVENTING APPARATUS

(71) Applicant: KAWASAKI JUKOGYO KABUSHIKI KAISHA, Kobe (JP)

(72) Inventors: Masahiro Matsuo, Akashi (JP); Hiroaki Fujiwara, Kobe (JP)

(73) Assignee: KAWASAKI JUKOGYO KABUSHIKI KAISHA, Kobe (JP)

(*) Notice: Subject to any disclaimer, the term of this patent is extended or adjusted under 35 U.S.C. 154(b) by 0 days.

(21) Appl. No.: 16/651,251

(22) PCT Filed: Sep. 20, 2018

(86) PCT No.: PCT/JP2018/034727
§ 371 (c)(1),
(2) Date: Mar. 26, 2020

(87) PCT Pub. No.: WO2019/065428
PCT Pub. Date: Apr. 4, 2019

(65) Prior Publication Data
US 2020/0277754 A1 Sep. 3, 2020

(30) Foreign Application Priority Data
Sep. 26, 2017 (JP) .............................. JP2017-184744

(51) Int. Cl.
*F15B 13/04* (2006.01)
*E02F 9/22* (2006.01)
*F16K 31/124* (2006.01)

(52) U.S. Cl.
CPC .......... *F15B 13/0402* (2013.01); *E02F 9/226* (2013.01); *E02F 9/2207* (2013.01); *F16K 31/1245* (2013.01)

(58) Field of Classification Search
CPC .............................. F15B 11/003; F15B 13/01; F15B 2013/0402; F15B 21/087; E02F 9/2207; E02F 9/226; F16K 31/1245
See application file for complete search history.

(56) References Cited

U.S. PATENT DOCUMENTS

| | | | | |
|---|---|---|---|---|
| 3,640,069 A | * | 2/1972 | Sugahara | F15B 21/00 415/27 |
| 5,197,283 A | * | 3/1993 | Kagiwada | E02F 9/123 60/451 |

(Continued)

FOREIGN PATENT DOCUMENTS

JP 2558115 Y2 12/1997

*Primary Examiner* — Thomas E Lazo
(74) *Attorney, Agent, or Firm* — Oliff PLC

(57) ABSTRACT

Provided is a swing-back preventing apparatus capable of preventing a hydraulic actuator in a stop state from operating by undesired load. The swing-back preventing apparatus includes a housing, a piston, and a pair of biasing members. First and second spaces are formed between the piston and the housing, and the piston includes a pair of communication passages that are communicable with first and second spaces. When the piston is located at a first offset position, the first space is blocked from a first port. When the piston separates from the first offset position, the first space is connected to the first port. When the piston is located at a second offset position, the second space is blocked from a second port. When the piston separates from the second offset position, the second space is connected to the second port. When the piston is located at a position on the first offset position side of a neutral position, a first communication passage is connected to the first space. When the piston is located in a range from the neutral position to the second offset position, the first communication passage is blocked from the first space. When the piston is located at a position on the second offset position side of the neutral (Continued)

position, a second communication passage is connected to the second space. When the piston is located in a range from the neutral position to the first offset position, the second communication passage is blocked from the second space.

9 Claims, 10 Drawing Sheets

(56) References Cited

U.S. PATENT DOCUMENTS

| | | | | |
|---|---|---|---|---|
| 5,884,984 | A | * 3/1999 | Arai | E02F 9/123 303/11 |
| 6,295,811 | B1 | * 10/2001 | Mangano | E02F 9/123 137/115.16 |
| 6,581,378 | B1 | * 6/2003 | Lebrun | E02F 9/123 60/394 |

* cited by examiner

SWING-BACK PREVENTING APPARATUS

TECHNICAL FIELD

The present invention relates to a swing-back preventing apparatus used to prevent swing-back that occurs at a hydraulic actuator.

BACKGROUND ART

Construction machines and the like include hydraulic actuators, such as hydraulic motors and hydraulic cylinders, to move structures, attachments, and the like. Such hydraulic actuator includes two ports. An operating direction of the hydraulic actuator is switched by changing supply and discharge of an operating liquid through the two ports. In the hydraulic actuator configured as above, when the weight of the structure, the attachment, or the like is heavy, pumping of the hydraulic actuator occurs at the time of braking due to inertial force of the structure, the attachment, or the like, and this causes a swing-back phenomenon. To prevent the swing-back phenomenon, a swing-back preventing apparatus is attached to the hydraulic actuator. A valve device of PTL 1 is known as one example of the swing-back preventing apparatus.

The valve device of PTL 1 includes a housing and two poppets. The housing includes two small holes and a communication passage. The two small holes are connected to the respective two ports of the hydraulic actuator and communicate with each other through the communication passage. The two poppets are arranged in the housing so as to be inserted into the communication passage. The operating liquid flowing through one of the small holes to the communication passage flows around the two poppets and is then introduced to the other of the small holes. The two poppets move in accordance with a differential pressure between the two ports of the hydraulic actuator. The two poppets move to close the communication passage. To be specific, when the liquid pressure of one of the ports becomes high, the two poppets move to one side to close the communication passage. When the liquid pressure of the other of the ports becomes high, the two poppets move to the other side to close the communication passage.

In the valve device configured as above, when the port of high pressure in the pumping in the swing-back phenomenon switches from one port to the other port, the two poppets are made to move to the other side. At this time, the communication passage opens, and the two ports are connected to each other through the communication passage. With this, the pressure difference between the liquid pressure of one port and the liquid pressure of the other port is made small, and this suppresses the occurrence of the swing-back phenomenon.

CITATION LIST

Patent Literature

PTL 1: Japanese Utility Model Registration No. 2558115

SUMMARY OF INVENTION

Technical Problem

In the valve device of PTL 1, when the hydraulic actuator stops, and the differential pressure between the two ports is substantially zero, the two poppets are located at neutral positions, and the communication passage is in an open state. To be specific, a closed circuit is formed between the hydraulic actuator and the valve device. Therefore, the hydraulic actuator can perform the pumping. For example, when the construction machine stops on an oblique surface, undesired load acts on the hydraulic actuator by the own weight of the structure. In this case, the operating liquid flows between the two ports of the hydraulic actuator, and this operates the hydraulic actuator.

An object of the present invention is to provide a swing-back preventing apparatus capable of preventing a hydraulic actuator in a stop state from operating by undesired load.

Solution to Problem

A swing-back preventing apparatus of the present invention includes: a housing including a first port, a second port, and a piston hole, the first port being connected to a first supply/discharge port of a hydraulic actuator configured to switch an operating direction by changing supply and discharge of an operating liquid to and from the first supply/discharge port and a second supply/discharge port of the hydraulic actuator, the second port being connected to the second supply/discharge port, the piston hole being connected to the first port and the second port; a piston configured to receive a liquid pressure of the first port and a liquid pressure of the second port such that these liquid pressures act against each other, the piston being inserted in the piston hole so as to be movable to a position corresponding to a differential pressure between the liquid pressure of the first port and the liquid pressure of the second port, the piston moving from a neutral position to a first offset position when the liquid pressure of the second port is higher than the liquid pressure of the first port, the piston moving from the neutral position to a second offset position when the liquid pressure of the first port is higher than the liquid pressure of the second port; and a pair of biasing members configured to act against the respective liquid pressures of the first and second ports and bias the piston to make the piston return to the neutral position. The piston includes a pair of communication passages that are communicable with first and second spaces facing the piston. When the piston is located at the first offset position, the first space is blocked from the first port. When the piston separates from the first offset position, the first space is connected to the first port. When the piston is located at the second offset position, the second space is blocked from the second port. When the piston separates from the second offset position, the second space is connected to the second port. When the piston is located at a position on the first offset position side of the neutral position, a first communication passage that is one of the pair of communication passages is connected to the first space. When the piston is located in a range from the neutral position to the second offset position, the first communication passage is blocked from the first space. When the piston is located at a position on the second offset position side of the neutral position, a second communication passage that is the other of the pair of communication passages is connected to the second space. When the piston is located in a range from the neutral position to the first offset position, the second communication passage is blocked from the second space.

According to the present invention, when the piston is located at the neutral position, the communication passages are blocked from the respective first and second spaces. Therefore, by making the piston return to the neutral position, the flow of the operating liquid between the two ports can be suppressed. With this, even when undesired load acts on the hydraulic actuator, the hydraulic actuator can be prevented from operating.

In the above invention, the swing-back preventing apparatus may further include: a first blocking mechanism configured to allow flow of the operating liquid in the first communication passage from the first space side to the second space side and stop flow of the operating liquid in the first communication passage from the second space side to the first space side; and a second blocking mechanism configured to allow flow of the operating liquid in the second communication passage from the second space side to the first space side and stop flow of the operating liquid in the second communication passage from the first space side to the second space side.

According to the above configuration, when the piston separates from each offset position and moves to the neutral position, the flow of the operating liquid is stopped by a check valve until the magnitude of the liquid pressure of the first port and the magnitude of the liquid pressure of the second port are reversed. To be specific, when the magnitude of the liquid pressure of the first port and the magnitude of the liquid pressure of the second port are reversed, the first port and the second port communicate with each other by the communication passages. Therefore, the two ports can be made to communicate with each other in a state where the differential pressure between the two ports is lower. On this account, the differential pressure can be made to become zero more quickly, and the swing-back phenomenon can be suppressed more quickly.

In the above invention, the piston may be configured such that: an opening area of the first communication passage decreases as the piston moves from the second offset position to the neutral position; and an opening area of the second communication passage decreases as the piston moves from the first offset position to the neutral position.

According to the above configuration, the opening area of each communication passage decreases as the piston moves from each offset position to the neutral position. In other words, the opening area of each communication passage is maximum in the vicinity of each offset position. Therefore, the operating liquid can be made to flow between the two ports at a high flow rate from immediately after the two ports communicate with each other by the communication passages. With this, as compared to a case where the opening areas increase as the piston moves, the differential pressure can be made to become zero more quickly, and the swing-back of the hydraulic actuator can be stopped more quickly.

In the above invention, the swing-back preventing apparatus may further include a pair of flow rate control spools configured to control flow rates of the operating liquid supplied to and discharged from a damping chamber, the damping chamber being formed between the housing and the piston and configured to adjust a movement speed of the piston by supplying or discharging the operating liquid to or from the first port or the second port in accordance with a movement of the piston. When the piston moves, a first flow rate control spool that is one of the pair of flow rate control spools may supply or discharge the operating liquid to or from the damping chamber at a fixed flow rate regardless of the liquid pressure of the first port. When the piston moves, a first flow rate control spool that is the other of the pair of flow rate control spools may supply or discharge the operating liquid to or from the damping chamber at a fixed flow rate regardless of the liquid pressure of the second port.

According to the above configuration, a time in which the two ports communicate with each other can be secured regardless of the pressures of the two ports. With this, the swing-back phenomenon can be suppressed regardless of the pressures of the two ports.

A swing-back preventing apparatus of the present invention includes: a housing including a first port, a second port, and a piston hole, the first port being connected to a first supply/discharge port of a hydraulic actuator configured to switch an operating direction by changing supply and discharge of an operating liquid to and from the first supply/discharge port and a second supply/discharge port of the hydraulic actuator, the second port being connected to the second supply/discharge port, the piston hole being connected to the first port and the second port; and a piston configured to receive a liquid pressure of the first port and a liquid pressure of the second port such that these liquid pressures act against each other, the piston being inserted in the piston hole so as to be movable to a position corresponding to a differential pressure between the liquid pressure of the first port and the liquid pressure of the second port, the piston moving from a neutral position to a first offset position when the liquid pressure of the first port is higher than the liquid pressure of the second port, the piston moving from the neutral position to a second offset position when the liquid pressure of the second port is higher than the liquid pressure of the first port. The piston includes a communication passage that is communicable with first and second spaces facing the piston. When the piston is located at the neutral position, the first space is connected to the first port. When the piston is located at the first offset position, the first space is blocked from the first port. When the piston is located at the neutral position, the second space is connected to the second port. When the piston is located at the second offset position, the second space is blocked from the second port. In the piston, the communication passage changes a communication state with the first port and a communication state with the second port in accordance with a position of the piston.

According to the present invention, the communication passage connecting the two spaces is formed in the piston. Therefore, the swing-back preventing apparatus can be assembled by inserting the piston into the piston hole of the housing. On this account, the number of parts of the swing-back preventing apparatus can be reduced, and the ease of assembling of the swing-back preventing apparatus can be improved.

Advantageous Effects of Invention

According to the present invention, the hydraulic actuator in a stop state can be prevented from operating by the undesired load.

DESCRIPTION OF EMBODIMENTS

Hereinafter, swing-back preventing apparatuses 1 and 1A according to Embodiments 1 and 2 of the present invention will be described with reference to the drawings. It should be noted that directions stated in the following description are used for convenience sake, and directions and the like of components of the present invention are not limited. Each of the swing-back preventing apparatuses 1 and 1A described below is just one embodiment of the present invention. Therefore, the present invention is not limited to the embodiments, and additions, deletions, and modifications may be made within the scope of the present invention.

Embodiment 1

Figure 1:
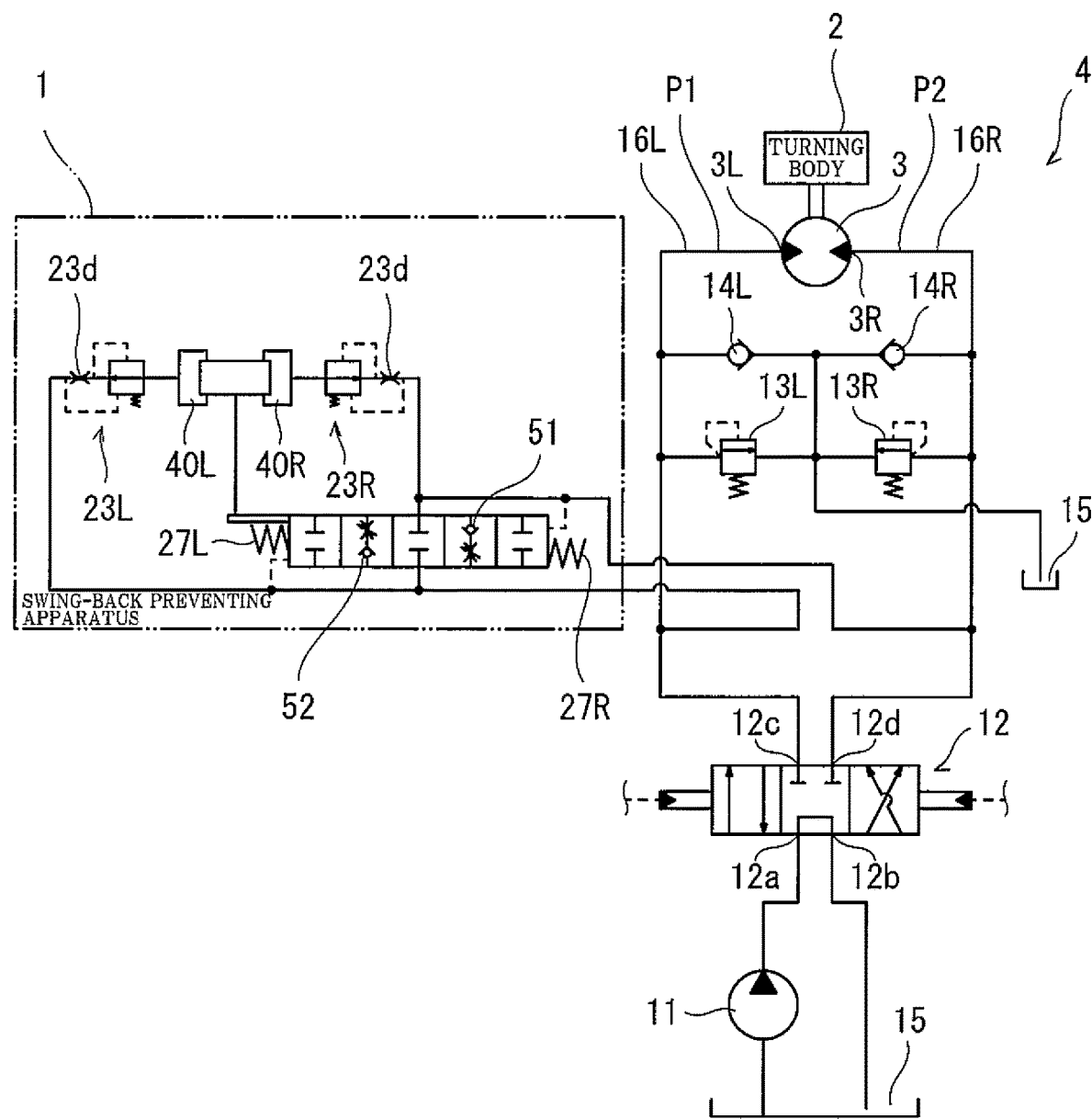
FIG. 1 is a circuit diagram showing the configuration of a hydraulic driving device including a swing-back preventing apparatus of the present invention.

Construction machines and the like include various structures, attachments, and the like and moves such structures and attachments to perform work, such as excavating work and carrying work. For example, in a hydraulic excavator that is one example of the construction machine, as shown in FIG. 1, a turning body 2 that is the structure is mounted on a travelling device so as to be rotatable, and a bucket that is the attachment is attached to the turning body 2 through a boom and an arm (not shown). Further, the turning body 2 is connected to a hydraulic motor 3 through a reduction gear (not shown) or the like. The hydraulic motor 3 that is one example of a hydraulic actuator includes two supply/discharge ports 3L and 3R through which an operating liquid is supplied and discharged. A rotational direction (i.e., an operating direction) of the hydraulic motor 3 is switched by changing supply and discharge of the operating liquid through the two supply/discharge ports 3L and 3R. For example, when a pressure liquid is supplied to the supply/discharge port 3L, the hydraulic motor 3 discharges the pressure liquid from the supply/discharge port 3R and makes the turning body 2 rotate in a normal direction. When the pressure liquid is supplied to the supply/discharge port 3R, the hydraulic motor 3 discharges the pressure liquid from the supply/discharge port 3L and makes the turning body 2 rotate in a reverse direction. A hydraulic driving system 4 is connected to the hydraulic motor 3 to supply the operating liquid to the hydraulic motor 3.

As described above, the hydraulic driving system 4 supplies the operating liquid to the hydraulic motor 3 to drive the hydraulic motor 3. In addition, the hydraulic driving system 4 switches a flow direction of the supplied operating liquid to switch the rotational direction of the hydraulic motor 3. To be specific, the hydraulic driving system 4 includes a hydraulic pump 11, a direction control valve 12, two relief valves 13L and 13R, and two check valves 14L and 14R. The hydraulic pump 11 is, for example, a swash plate pump. The hydraulic pump 11 sucks the operating liquid from a tank 15, pressurizes the operating liquid, and discharges the operating liquid to the direction control valve 12.

The direction control valve 12 includes, for example, four ports 12a to 12d. The ports 12a, 12b, 12c, and 12d are respectively connected to the hydraulic pump 11, the tank 15, and the supply/discharge ports 3L and 3R of the hydraulic motor 3. The direction control valve 12 changes connection statuses of the four ports 12a to 12d in accordance with a differential pressure between two pilot pressures output from an operating device (not shown). To be specific, the direction control valve 12 can switch each of a connection destination of the hydraulic pump 11 and a connection destination of the tank 15 between the supply/discharge ports 3L and 3R. Further, the direction control valve 12 can block the supply/discharge ports 3L and 3R from the hydraulic pump 11 and the tank 15. The direction control valve 12 configured as above changes the connection statuses of the four ports 12a to 12d to switch the flow direction of the operating liquid flowing to the hydraulic motor 3. The relief valve 13L and the check valve 14L are connected to a liquid passage 16L connecting the direction control valve 12 and the supply/discharge port 3L of the hydraulic motor 3. The relief valve 13R and the check valve 14R are connected to a liquid passage 16R connecting the direction control valve 12 and the supply/discharge port 3R of the hydraulic motor 3.

When the pressure of the operating liquid flowing through the liquid passage 16L becomes a set pressure (i.e., a relief pressure) or more, the relief valve 13L discharges to the tank 15 the operating liquid flowing through the liquid passage 16L. When the pressure of the operating liquid flowing through the liquid passage 16R becomes a set pressure (i.e., a relief pressure) or more, the relief valve 13R discharges to the tank 15 the operating liquid flowing through the liquid passage 16R. When the flow rate of the operating liquid flowing through the liquid passage 16L is inadequate, the operating liquid can be sucked from the tank 15 through the check valve 14L. When the flow rate of the operating liquid flowing through the liquid passage 16R is inadequate, the operating liquid can be sucked from the tank 15 through the check valve 14R. To be specific, the check valves 14L and 14R are connected to the tank 15. The check valve 14L allows the flow of the operating liquid from the tank 15 to the liquid passage 16L and blocks the flow in its opposite direction. The check valve 14R allows the flow of the operating liquid from the tank 15 to the liquid passage 16R and blocks the flow in its opposite direction.

In the hydraulic driving system 4 configured as above, when one of the pilot pressures is output from the operating device to the direction control valve 12 to move the turning body 2, the hydraulic pump 11 is connected to one of the two supply/discharge ports 3L and 3R, and the tank 15 is connected to the other of the two supply/discharge ports 3L and 3R. With this, the hydraulic motor 3 rotates to make the turning body 2 rotate in one of the normal direction and the reverse direction. Then, when the pilot pressure from the operating device is stopped to stop the rotation of the turning body 2, the two supply/discharge ports 3L and 3R are blocked from the hydraulic pump 11 and the tank 15, and pumping of the hydraulic motor 3 occurs by inertial force of the turning body 2. For example, when stopping the turning body 2 that is rotating in the normal direction, the two supply/discharge ports 3L and 3R are blocked as above, and with this, the hydraulic motor 3 sucks the operating liquid from the tank 15 through the check valve 14L to the first supply/discharge port 3L and discharges the operating liquid to the second supply/discharge port 3R. When the operating liquid is discharged, the liquid pressure of the liquid passage 16R increases. When the liquid pressure exceeds the set pressure, the operating liquid is discharged from the relief valve 13R to the tank 15. With this, the pressure difference is generated between the two ports 3L and 3R of the hydraulic motor 3, and the hydraulic motor 3 is braked by this pressure difference.

When the hydraulic motor 3 is continued to be braked as above, the liquid pressure of the operating liquid discharged from the hydraulic motor 3 to the liquid passage 16R becomes less than the set pressure, and therefore, the relief valve 13R is closed. Thus, the hydraulic motor 3 stops. When the hydraulic motor 3 is stopped, the liquid pressure of the liquid passage 16L is substantially equal to the liquid pressure of the tank 15, i.e., tank pressure, but the liquid pressure of the liquid passage 16R is substantially equal to the set pressure. Therefore, there is the pressure difference between the two ports 3L and 3R of the hydraulic motor 3. On this account, although the hydraulic motor 3 stops once, the hydraulic motor 3 starts rotating reversely by the above-described differential pressure, i.e., the hydraulic motor 3 makes the turning body 2 rotate in the reverse direction. Further, even after the hydraulic motor 3 rotates in the reverse direction, the hydraulic motor 3 rotates beyond a position where the pressure difference becomes zero. With this, the turning body 2 is made to rotate reversely in the normal direction. To prevent a swing-back phenomenon in which such reverse rotations are repeated, a swing-back preventing apparatus 1 is connected to the two liquid passages 16L and 16R so as to connect the two liquid passages 16L and 16R to each other.

Swing-Back Preventing Apparatus

The swing-back preventing apparatus 1 is an apparatus configured to prevent swing-back of the hydraulic motor 3. The swing-back preventing apparatus 1 mainly includes a housing 21, a piston 22, a pair of spools 23L and 23R, and a pair of seat members 24L and 24R. The housing 21 is, for example, a valve block. A piston hole 30 extending along a predetermined axis L1 is formed at the housing 21. The piston hole 30 is a hole penetrating the housing 21. The piston hole 30 includes openings 30a and 30b at both sides thereof. Plugs 25L and 25R are inserted into and threadedly engaged with the openings 30a and 30b, respectively. With this, the piston hole 30 is sealed.

A first port 31 and a second port 32 are formed at the housing 21. The first port 31 is formed in the vicinity of the first opening 30a, and the second port 32 is formed in the vicinity of the second opening 30b. To be specific, the two ports 31 and 32 are arranged away from each other in an axial direction that is a direction in which the axis L1 extends. The first port 31 is connected to the liquid passage 16L, and the second port 32 is connected to the liquid passage 16R. The two ports 31 and 32 are connected to the piston hole 30. The piston 22 is inserted in the piston hole 30 formed as above.

The piston 22 is inserted in the piston hole 30 so as to be slidable in the axial direction. The piston 22 includes a piston main body 34 and a pair of plugs 35L and 35R. The piston main body 34 is formed in a substantially columnar shape. The piston main body 34 includes a spring receiving portion 34a at an axial intermediate portion thereof. The spring receiving portion 34a of the piston main body 34 is larger in diameter than the other portion of the piston main body 34 (i.e., both axial end side portions 34b and 34c of the piston main body 34). An outer diameter of the spring receiving portion 34a is substantially equal to an inner diameter of the piston hole 30. To be specific, the piston 22 is slidably inserted in the piston hole 30 with an outer peripheral surface of the spring receiving portion 34a contacting an inner peripheral surface of the piston hole 30. The spring receiving portion 34a contacts the inner peripheral surface of the piston hole 30, and with this, the spring receiving portion 34a divides the piston hole 30 into a space at one axial side of the spring receiving portion 34a and a space at the other axial side of the spring receiving portion 34a and prevents the operating liquid from flowing between these spaces. A pair of accommodating holes 36L and 36R are formed at the piston main body 34 configured as above.

The pair of accommodating holes 36L and 36R are formed at both respective axial ends of the piston main body 34 around an axis of the piston main body 34. The pair of accommodating holes 36L and 36R extend in the axial direction from both respective axial ends of the piston main body 34 to the vicinity of a middle portion of the piston main body 34. The plug 35L is inserted in an opening of the accommodating hole 36L, and the plug 35R is inserted in an opening of the accommodating hole 36R. The plugs 35L and 35R are threadedly engaged with the piston main body 34 in a sealed state. A through hole 35a is formed at the plug 35L so as to penetrate the plug 35L along an axis of the plug 35L, and a through hole 35a is formed at the plug 35R so as to penetrate the plug 35R along an axis of the plug 35R. Further, two communication holes 37 are formed at the piston main body 34. The communication holes 37 penetrate the piston main body 34 in a radial direction. The two communication holes 37 are open on a side surface of the piston main body 34. The through hole 35a and the communication hole 37 are connected to the corresponding accommodating hole 36L and constitute a damping passage 38L together with the corresponding accommodating hole 36L, and the through hole 35a and the communication hole 37 are connected to the corresponding accommodating hole 36R and constitute a damping passage 38R together with the corresponding accommodating hole 36R. To be specific, the pair of damping passages 38L and 38R are formed at the piston 22, and each of the damping passages 38L and 38R includes openings on an axial end surface and side surface of the piston 22. The operating liquid flows through the damping passages 38L and 38R. To control the flow rate of the operating liquid, the spools 23L and 23R are accommodated in the respective accommodating holes 36L and 36R.

The spools 23L and 23R that are flow rate control spools are so-called pressure compensation spools. The spool 23L controls the flow rate of the operating liquid flowing through the damping passage 38L to a fixed flow rate regardless of pressure, and the spool 23R controls the flow rate of the operating liquid flowing through the damping passage 38R to a fixed flow rate regardless of pressure. To be specific, each of the spools 23L and 23R is formed in a substantially cylindrical shape, and the spools 23L and 23R are inserted in the respective accommodating holes 36L and 36R so as to be slidable in the axial direction. More specifically, an axial intermediate portion of the spool 23L is larger in diameter than the other portion of the spool 23L, and an axial intermediate portion of the spool 23R is larger in diameter than the other portion of the spool 23R. An outer diameter of the axial intermediate portion of the spool 23L is substantially equal to an inner diameter of the accommodating hole 36L, and an outer diameter of the axial intermediate portion of the spool 23R is substantially equal to an inner diameter of the accommodating hole 36R. Therefore, the accommodating hole 36L is divided by the spool 23L into a first axial space 36a and a second axial space 36b, and these spaces 36a and 36b communicate with each other through an inner hole 23c of the spool 23L. The accommodating hole 36R is divided by the spool 23R into a first axial space 36a and a second axial space 36b, and these spaces 36a and 36b communicate with each other through an inner hole 23c of the spool 23R. A restrictor 23d is formed at one axial end side (i.e., the plug 35L or 35R side) of each inner hole 23c. The operating liquid flowing between the first axial space 36a and the second axial space 36b flows through the restrictor 23d.

A recessed portion 23e is formed on an outer peripheral surface of the spool 23L over the entire periphery in a circumferential direction, and a recessed portion 23e is formed on an outer peripheral surface of the spool 23R over the entire periphery in a circumferential direction. The recessed portion 23e of the spool 23L is formed at a position corresponding to the corresponding communication hole 37 and is connected to the corresponding inner hole 23c through a through hole 23f penetrating the spool 23L in the radial direction. The recessed portion 23e of the spool 23R is formed at a position corresponding to the corresponding communication hole 37 and is connected to the corresponding inner hole 23c through a through hole 23f penetrating the spool 23R in the radial direction. The recessed portion 23e of the spool 23L is arranged such that an opening area of the corresponding communication hole 37 changes in accordance with the position of the spool 23L, and the recessed portion 23e of the spool 23R is arranged such that an opening area of the corresponding communication hole 37 changes in accordance with the position of the spool 23R. To be specific, the spool 23L can change the opening area of the damping passage 38L in accordance with the position of the spool 23L, and the spool 23R can change the opening area of the damping passage 38R in accordance with the position of the spool 23R.

A spring 26L is provided between the spool 23L configured as above and the plug 35L, and a spring 26R is provided between the spool 23R configured as above and the plug 35R. The springs 26L and 26R are so-called compression coil springs. The spring 26L biases the spool 23L in a direction away from the plug 35L (i.e., in a direction toward the second axial space 36b), and the spring 26R biases the spool 23R in a direction away from the plug 35R (i.e., in a direction toward the second axial space 36b). The spool 23L biased as above adjusts the opening area of the damping passage 38L by moving to a position where the differential pressure between the front and rear sides of the restrictor 23d and the biasing force of the spring 26L are balanced, and the spool 23R biased as above adjusts the opening area of the damping passage 38R by moving to a position where the differential pressure between the front and rear sides of the restrictor 23d and the biasing force of the spring 26R are balanced. With this, the operating liquid can be made to flow to each of the damping passages 38L and 38R at a fixed flow rate regardless of the pressure of the first axial space 36a.

The above-described spools 23L and 23R are provide in the piston 22 as above, and in this state, the piston 22 is inserted in the piston hole 30 of the housing 21. Further, in this state, the seat members 24L and 24R are externally attached to the respective axial end side portions 34b and 34c of the piston main body 34. Each of the pair of seat members 24L and 24R is formed in a substantially cylindrical shape. The pair of seat members 24L and 24R are inserted in and fixed to the piston hole 30 while being externally attached to the respective axial end side portions 34b and 34c of the piston main body 34. More specifically, a flange 24a is formed at one axial end portion of an outer peripheral surface of the seat member 24L over the entire periphery in the circumferential direction, and a flange 24a is formed at one axial end portion of an outer peripheral surface of the seat member 24R over the entire periphery in the circumferential direction. Each of an inner diameter of the piston hole 30 in the vicinity of the opening 30a and an inner diameter of the piston hole 30 in the vicinity of the opening 30b is larger than an inner diameter of the other portion of the piston hole 30, and step portions 30c and 30d are formed at such respective large-diameter portions of the piston hole 30. The seat member 24L is inserted in the piston hole 30 such that the flange 24a of the seat member 24L is hooked on the step portion 30c, and the seat member 24R is inserted in the piston hole 30 such that the flange 24a of the seat member 24R is hooked on the step portion 30d. Further, the flange 24a of the seat member 24L is pressed against the step portion 30c by the plug 25L inserted in and threadedly engaged with the opening 30a, and the flange 24a of the seat member 24R is pressed against the step portion 30d by the plugs 25R inserted in and threadedly engaged with the opening 30b. The seat member 24L is fixed to the housing 21 by being sandwiched between the plug 25L and the step portion 30c, and the seat member 24R is fixed to the housing 21 by being sandwiched between the plug 25R and the step portion 30d.

Each of outer diameters of axial intermediate portions of the pair of seat members 24L and 24R is substantially equal to the inner diameter of the piston hole 30. The axial intermediate portions of the outer peripheral surfaces of the pair of seat members 24L and 24R contact the inner peripheral surface of the piston hole 30. A recessed portion 24b is formed on the outer peripheral surface of the seat member 24L so as to be located between the flange 24a of the seat member 24L and the axial intermediate portion of the seat member 24L, and a recessed portion 24b is formed on the outer peripheral surface of the seat member 24R so as to be located between the flange 24a of the seat member 24R and the axial intermediate portion of the seat member 24R. The recessed portions 24b are recessed inward in the radial direction over the entire periphery in the circumferential direction. The recessed portion 24b of the seat member 24L is arranged at a position corresponding to the first port 31, and the recessed portion 24b of the seat member 24R is arranged at a position corresponding to the second port 32. The operating liquid flows between the annular recessed portion 24b of the seat member 24L and the port 31 and between the annular recessed portion 24b of the seat member 24R and the port 32. The outer peripheral surfaces of the other axial end portions of the pair of seat members 24L and 24R are recessed inward in the radial direction. The other axial end side portions of the pair of seat members 24L and 24R are located away from the inner peripheral surface of the piston hole 30. The other axial ends of the pair of seat members 24L and 24R are opposed to the spring receiving portion 34a of the piston main body 34 but are away from the spring receiving portion 34a of the piston main body 34 in the axial direction. With this, an annular damping chamber 40L sandwiched by the seat member 24L and the spring receiving portion 34a of the piston main body 34 is formed between the inner peripheral surface of the piston hole 30 and the piston 22, and an annular damping chamber 40R sandwiched by the seat member 24R and the spring receiving portion 34a of the piston main body 34 is formed between the inner peripheral surface of the piston hole 30 and the piston 22. The damping passages 38L and 38R are connected to the respective damping chambers 40L and 40R, and the communication holes 37 are arranged so as to correspond to the respective damping chambers 40L and 40R.

The axial intermediate portion of the outer peripheral surface of the seat member 24L configured as above is formed to be large in diameter to isolate the damping chamber 40L and the recessed portion 24*b* of the seat member 24L from each other, and the axial intermediate portion of the outer peripheral surface of the seat member 24R configured as above is formed to be large in diameter to isolate the damping chamber 40R and the recessed portion 24*b* of the seat member 24R from each other. With this, the axial intermediate portions of the pair of seat members 24L and 24R project outward in the radial direction relative to the other axial end side portions of the pair of seat members 24L and 24R and serve as spring receiving portions 24*h*. To be specific, a spring 27L that is a compression coil spring is accommodated in the damping chamber 40L, and the spring 27L in a compressed state is arranged between the spring receiving portion 24*h* of the seat member 24L and the opposing spring receiving portion 34*a* of the piston main body 34. Further, a spring 27R that is a compression coil spring is accommodated in the damping chamber 40R, and the spring 27R in a compressed state is arranged between the spring receiving portion 24*h* of the seat member 24R and the opposing spring receiving portion 34*a* of the piston main body 34. The two springs 27L and 27R arranged as above bias the piston main body 34 so as to act against each other. Inner peripheral surfaces of the pair of seat members 24L and 24R are formed as below.

To be specific, each of the inner peripheral surfaces of the pair of seat members 24L and 24R includes a medium-diameter portion 24*c*, a large-diameter portion 24*d*, and a small-diameter portion 24*e*. The medium-diameter portion 24*c*, the large-diameter portion 24*d*, and the small-diameter portion 24*e* are lined up in this order from one end side of each of the seat members 24L and 24R. To be specific, the medium-diameter portion 24*c* is located at the other axial end side on the inner peripheral surface of each of the seat members 24L and 24R. An inner diameter of the medium-diameter portion 24*c* of the seat member 24L is substantially equal to an outer diameter of the axial end side portion 34*b* of the piston main body 34, and an inner diameter of the medium-diameter portion 24*c* of the seat member 24R is substantially equal to an outer diameter of the axial end side portion 34*c* of the piston main body 34. The piston 22 is inserted in the medium-diameter portions 24*c* of the pair of seat members 24L and 24R so as to be slidable.

The small-diameter portion 24*e* is located at one end side on the inner peripheral surface of each of the seat members 24L and 24R and projects inward in the radial direction relative to the medium-diameter portion 24*c*. To be specific, an inner diameter of the small-diameter portion 24*e* of the seat member 24L is smaller than the outer diameter of the axial end side portion 34*b* of the piston main body 34 and is larger than an outer diameter of the plug 35L, and an inner diameter of the small-diameter portion 24*e* of the seat member 24R is smaller than the outer diameter of the axial end side portion 34*c* of the piston main body 34 and is larger than an outer diameter of the plug 35R. With this, an annular gap 24*f* is formed between the small-diameter portion 24*e* of the seat member 24L and one end portion (i.e., the plug 35L) of the piston 22, and an annular gap 24*f* is formed between the small-diameter portion 24*e* of the seat member 24R and the other end portion (i.e., the plug 35R) of the piston 22. A through hole 24*g* connecting the annular gap 24*f* and the recessed portion 24*b* is formed at each of the seat members 24L and 24R. The annular gap 24*f*, the recessed portion 24*b*, and the through hole 24*g* at the seat member 24L constitute a valve passage 29L connected to the first port 31, and the annular gap 24*f*, the recessed portion 24*b*, and the through hole 24*g* at the seat member 24R constitute a valve passage 29R connected to the second port 32.

The large-diameter portion 24*d* is located between the small-diameter portion 24*e* and the medium-diameter portion 24*c* on each of the inner peripheral surfaces of the seat members 24L and 24R and is recessed outward in the radial direction relative to the small-diameter portion 24*e* and the medium-diameter portion 24*c*. To be specific, an inner diameter of the large-diameter portion 24*d* of the seat member 24L is larger than the outer diameter of the axial end side portion 34*b* of the piston main body 34, and an inner diameter of the large-diameter portion 24*d* of the seat member 24R is larger than the outer diameter of the axial end side portion 34*b* of the piston main body 34. With this, a first space 28L having an annular shape is formed between the large-diameter portion 24*d* of the seat member 24L and the axial end side portion 34*b* of the piston main body 34, i.e., between the large-diameter portion 24*d* of the seat member 24L and one end portion of the piston 22 so as to face the axial end side portion 34*b* of the piston main body 34, and a second space 28R having an annular shape is formed between the large-diameter portion 24*d* of the seat member 24R and the axial end side portion 34*c* of the piston main body 34, i.e., between the large-diameter portion 24*d* of the seat member 24R and the other end portion of the piston 22 so as to face the axial end side portion 34*c* of the piston main body 34. A step is formed on the inner peripheral surface of the seat member 24L by a difference between the inner diameter of the large-diameter portion 24*d* and the inner diameter of the small-diameter portion 24*e* and constitutes a seat portion 41L, and a step is formed on the inner peripheral surface of the seat member 24R by a difference between the inner diameter of the large-diameter portion 24*d* and the inner diameter of the small-diameter portion 24*e* and constitutes a seat portion 41R.

Each of the seat portions 41L and 41R is formed in a substantially annular shape. The seat portions 41L and 41R are opposed to respective outer peripheral edges of both end portions of the piston main body 34. The outer peripheral edges of both end portions of the piston main body 34 are chamfered. When the piston main body 34 is moved to the seat portion 41L or 41R, the outer peripheral edge of the end portion of the piston main body 34 is seated on the corresponding seat portion 41L or 41R. When the piston main body 34 is seated on the first seat portion 41L of the first seat member 24L located at one axial side, communication between the first valve passage 29L and the first space 28L is blocked. When the piston main body 34 is seated on the second seat portion 41R of the second seat member 24R located at the other axial side, communication between the second valve passage 29R and the second space 28R is blocked.

In the swing-back preventing apparatus 1 configured as above, one end surface of the piston 22 is opposed to the plug 25L and is arranged away from the plug 25L in the axial direction, and a pilot chamber 42L is formed between the end surface of the piston 22 and the plug 25L. Further, the other end surface of the piston 22 is opposed to the plug 25R and is arranged away from the plug 25R in the axial direction, and a pilot chamber 42R is formed between the other end surface of the piston 22 and the plug 25R. Further, the first pilot chamber 42L is connected to the first valve passage 29L and is connected to the first port 31 through the first valve passage 29L. The second pilot chamber 42R is connected to the second valve passage 29R and is connected to the second port 32 through the second valve passage 29R. Therefore, both end surfaces of the piston 22 receive a liquid pressure P1 of the first port 31 and a liquid pressure P2 of the second port 32 such that the liquid pressures P1 and P2 act against each other. Thus, the piston 22 moves to a position corresponding to a differential pressure between the two liquid pressures. The piston 22 moves to a position where these pressures are balanced. Further, when the piston 22 moves, the operating liquid is supplied to or discharged from the damping chambers 40L and 40R. To supply or discharge the operating liquid, the pilot chamber 42L is connected to the damping chamber 40L through the damping passage 38L, and the pilot chamber 42R is connected to the damping chamber 40R through the damping passage 38R. The flow rate of the operating liquid supplied to and discharged from the damping chamber 40L is controlled by the spool 23L, and the flow rate of the operating liquid supplied to and discharged from the damping chamber 40R is controlled by the spool 23R. The piston 22 can move at a fixed speed regardless of the magnitude of the liquid pressure P1 of the first port 31 and the magnitude of the liquid pressure P2 of the second port 32.

Figure 2:
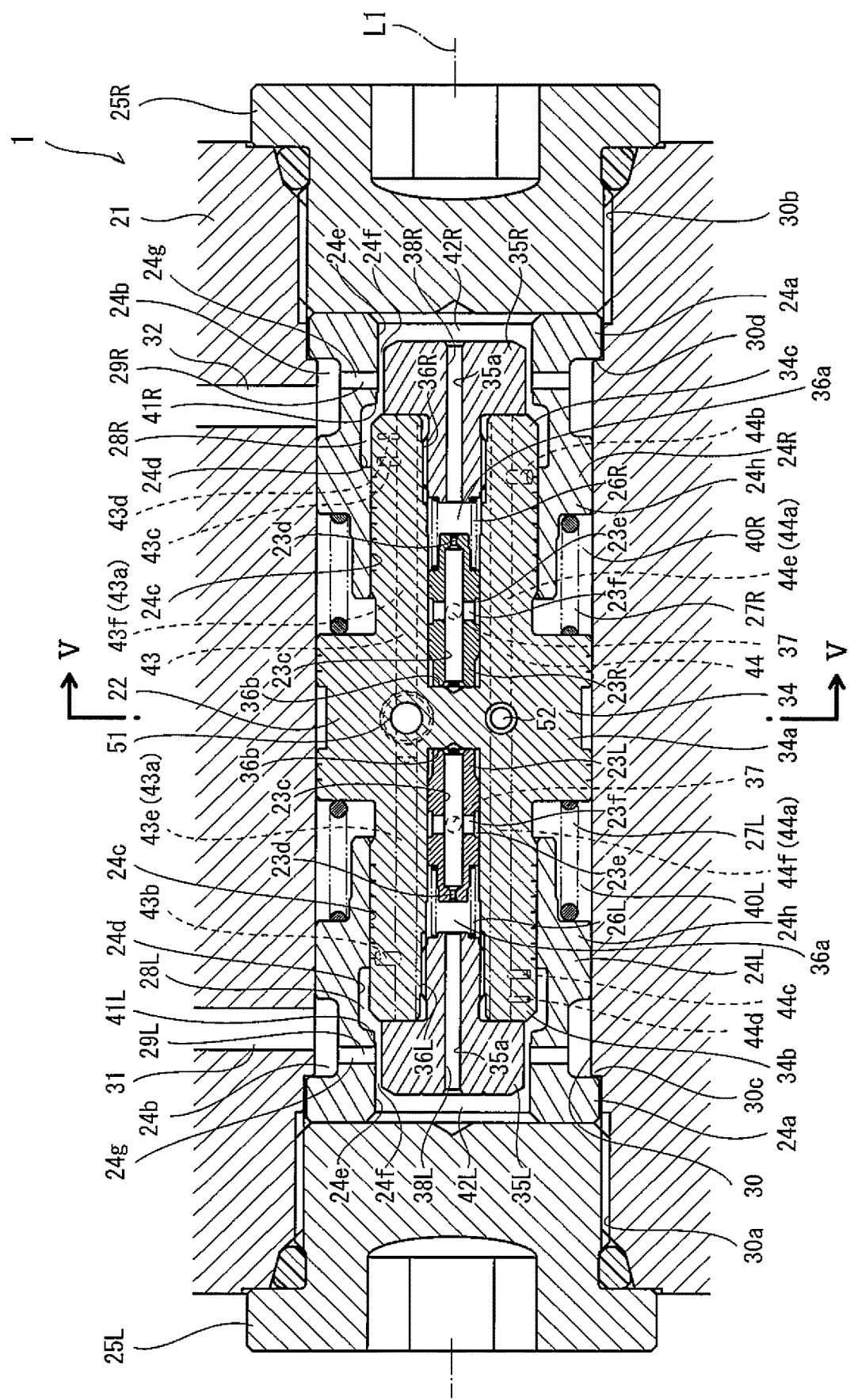
FIG. 2 is a front sectional view showing the configuration of the swing-back preventing apparatus according to Embodiment 1 of the present invention.
Figure 3:
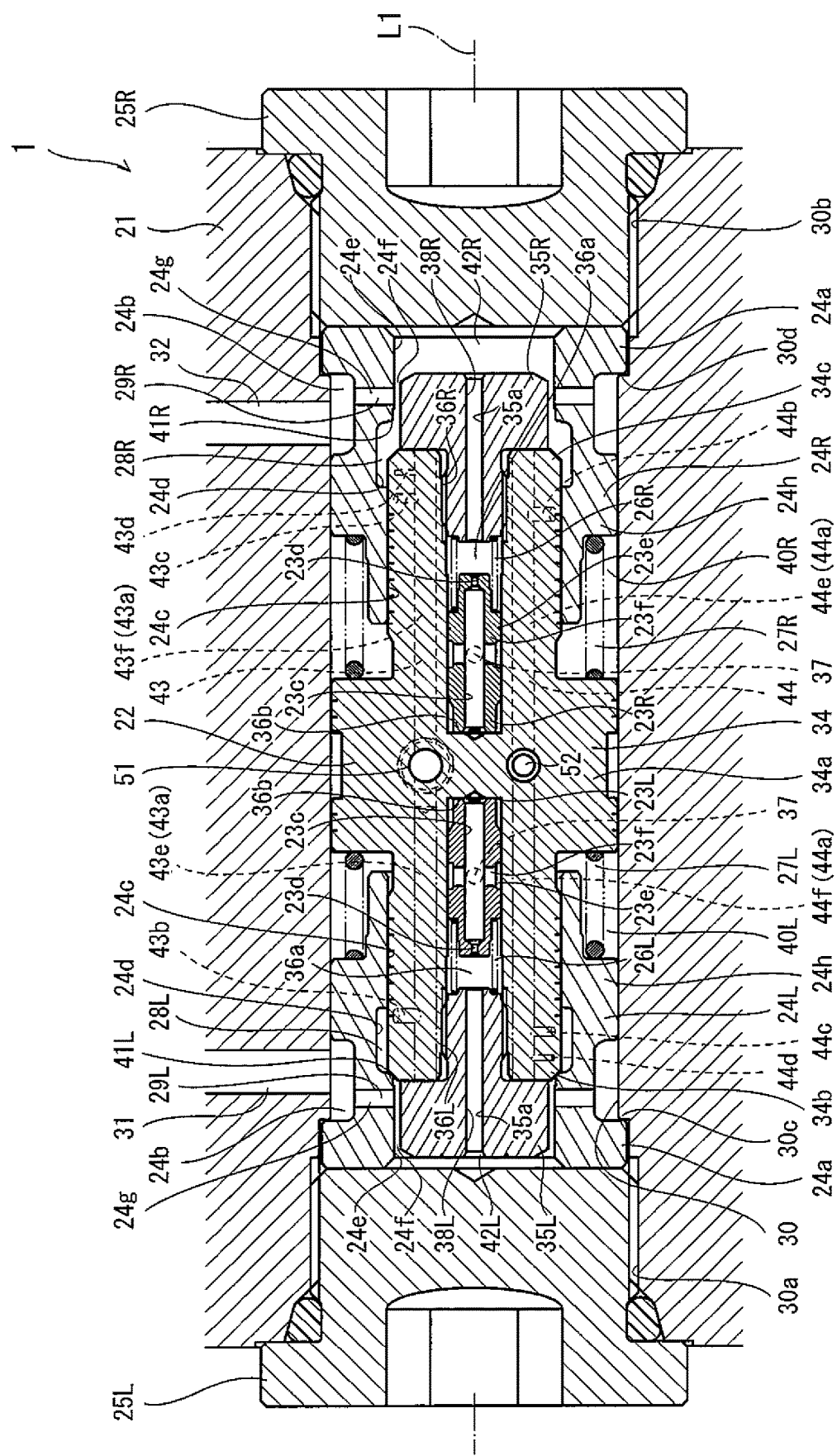
FIG. 3 is a front sectional view showing that a piston of the swing-back preventing valve of FIG. 2 is located at a first offset position.
Figure 4:
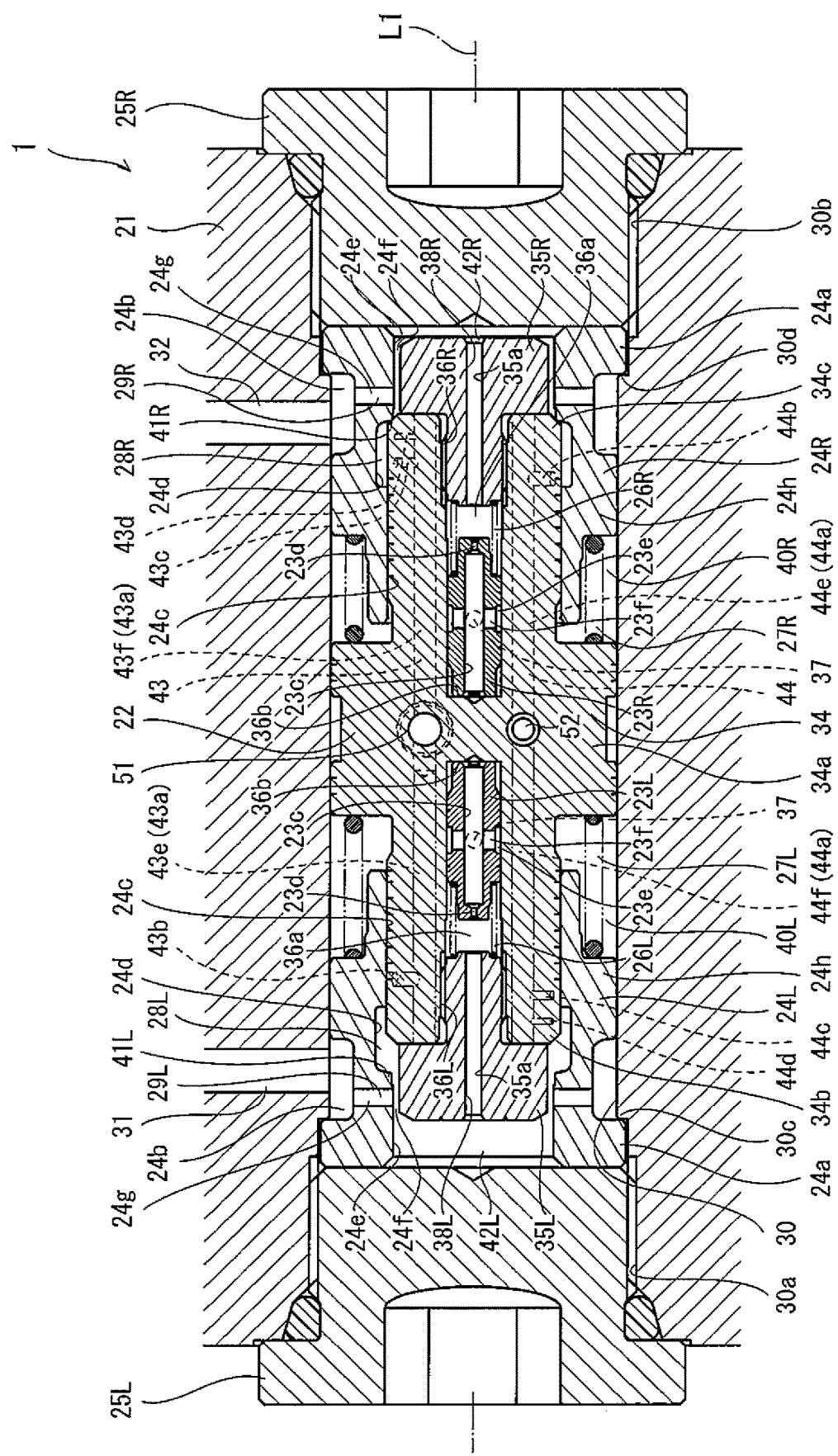
FIG. 4 is a front sectional view showing that the piston of the swing-back preventing valve of FIG. 2 is located at a second offset position.

As described above, the position of the piston 22 configured as above changes in accordance with the differential pressure between the liquid pressure P1 of the first port 31 and the liquid pressure P2 of the second port 32. For example, when an absolute value of the differential pressure is equal to or less than a predetermined value determined by the springs 27L and 27R, the piston 22 is located at a neutral position shown in FIG. 2. At the neutral position, the piston 22 is located away from the pair of seat portions 41L and 41R, and the valve passages 29L and 29R are connected to the corresponding spaces 28L and 28R. In contrast, when the absolute value of the differential pressure exceeds a predetermined range, the piston 22 moves in accordance with the differential pressure and is seated on one of the pair of seat portions 41L and 41R. For example, when the liquid pressure P2 of the second port 32 is higher than the liquid pressure P1 of the first port 31, the piston 22 moves to one side in the axial direction and is seated on the first seat portion 41L as shown in FIG. 3 (first offset position). With this, communication between the first valve passage 29L and the first space 28L is blocked. In contrast, when the liquid pressure P1 of the first port 31 is higher than the liquid pressure P2 of the second port 32, the piston 22 moves to the other side in the axial direction and is seated on the second seat portion 41R as shown in FIG. 4 (second offset position). With this, communication between the second valve passage 29R and the second space 28R is blocked. It should be noted that while the piston 22 is moving between the first offset position and the second offset position, as with when the piston 22 is located at the neutral position, the piston 22 is located away from the pair of seat portions 41L and 41R, and the valve passages 29L and 29R are connected to the corresponding spaces 28L and 28R. As above, the space 28L is blocked from the valve passage 29L or is made to communicate with the valve passage 29L in accordance with the position of the piston 22, and the space 28R is blocked from the valve passage 29R or is made to communicate with the valve passage 29R in accordance with the position of the piston 22. Further, two communication passages 43 and 44 are formed at the piston main body 34 to connect the two spaces 28L and 28R.

Figure 5:
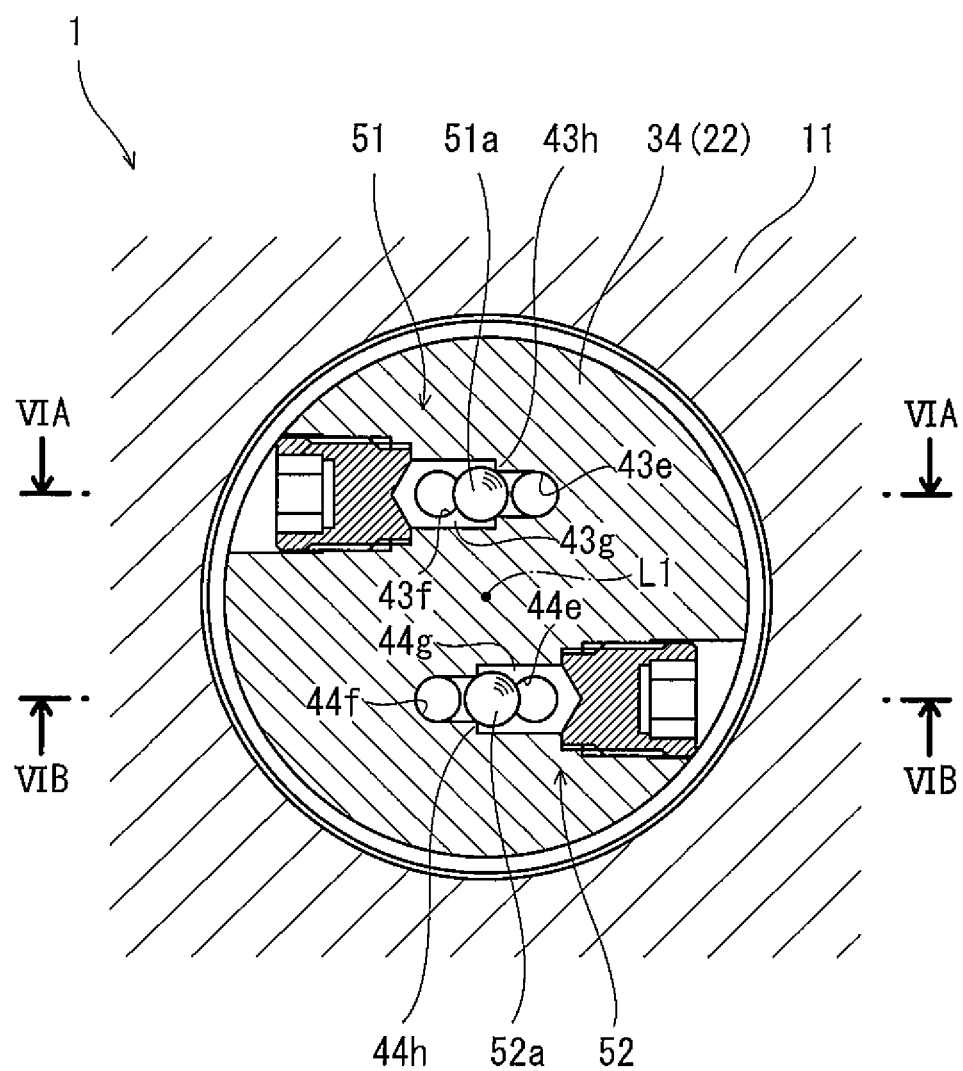
FIG. 5 is a side sectional view taken along line V-V of FIG. 2 and showing the swing-back preventing apparatus.
Figure 6A:
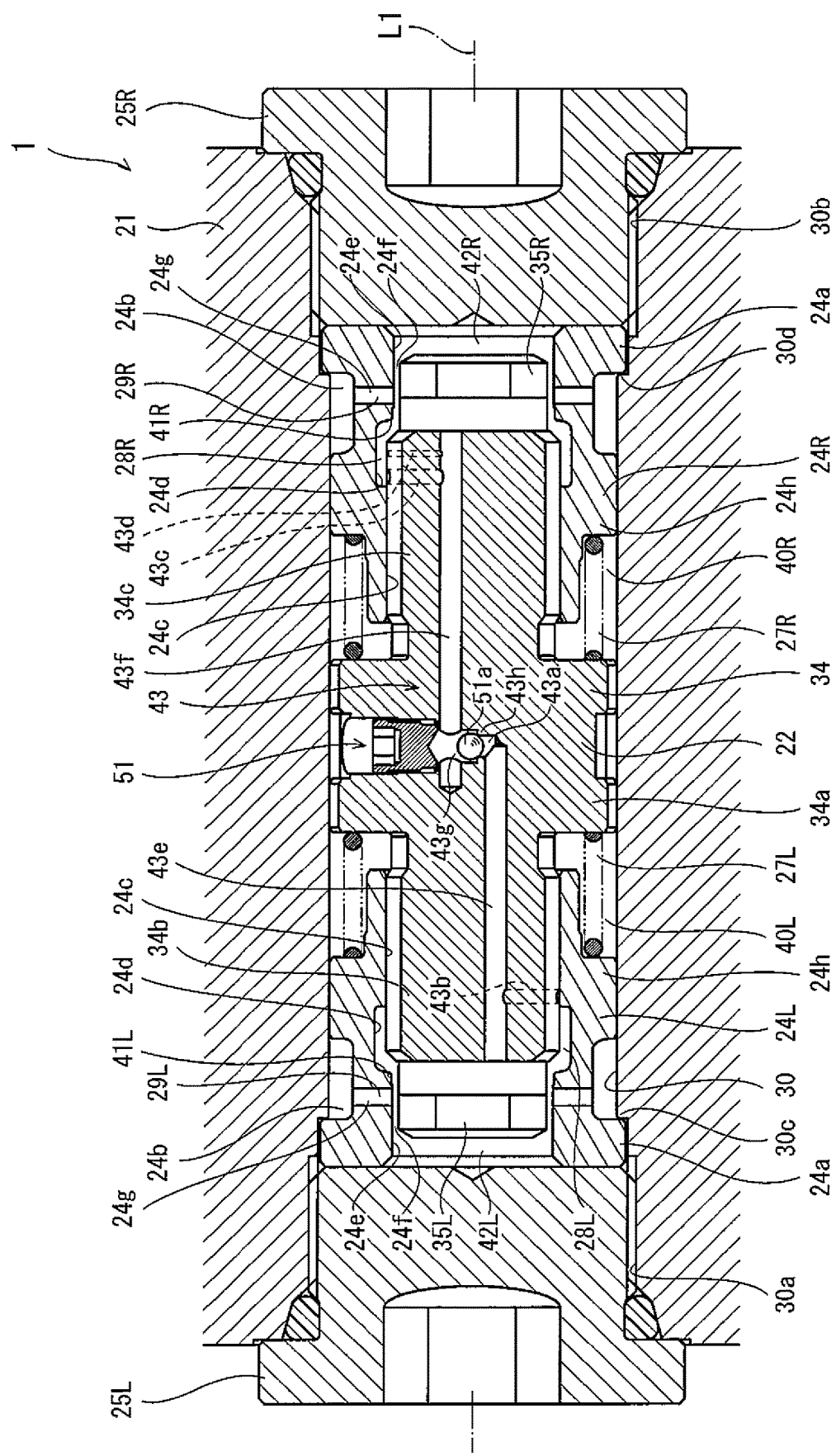
FIG. 6A is a plan sectional view taken along line VIA-VIA of FIG. 5 and showing the swing-back preventing apparatus.

As shown in FIG. 5, the two communication passages 43 and 44 are formed so as to extend along respective virtual flat planes (i.e., a cutting plane cut along a cutting line VIA-VIA and a cutting plane cut along a cutting line VIB-VIB) which are located away from each other in an upper-lower direction so as to sandwich an axis (that substantially coincides with the axis L1) of the piston main body 34. The first communication passage 43 that is one of the two communication passages 43 and 44 formed as above includes a passage main body 43a and three opening holes 43b to 43d as shown in FIG. 6A. The passage main body 43a is formed in a substantially Z shape on the cutting plane. To be specific, in a plan view of the cutting plane, first and second side portions 43e and 43f of the passage main body 43a are located away from each other at respective front and rear sides (in FIG. 1, at respective near and far sides on the paper surface), and a middle portion 43g of the passage main body 43a extends in a front-rear direction to connect the first and second side portions 43e and 43f. The first and second side portions 43e and 43f of the passage main body 43a respectively extend from the middle portion 43g to one end and the other end of the piston main body 34. The first opening hole 43b is connected to the first side portion 43e, and the second opening hole 43c and the third opening hole 43d are connected to the second side portion 43f.

The first opening hole 43b extends from the first side portion 43e in the radial direction and is open on the side surface of the piston main body 34. Further, the first opening hole 43b is formed so as to correspond to the position of the first space 28L and can be connected to the first space 28L in accordance with the position of the piston 22. To be specific, when the piston 22 is located between the neutral position and the second offset position, the first opening hole 43b is closed by the medium-diameter portion 24c of the first seat member 24L and is therefore blocked from the first space 28L (see FIGS. 2 and 4). Further, when the piston 22 moves from the neutral position toward the first offset position, the first opening hole 43b starts being connected to the first space 28L. When the piston 22 reaches the vicinity of the first offset position, the first opening hole 43b completely opens (see FIG. 3).

The second opening hole 43c and the third opening hole 43d extend from the second side portion 43f in the radial direction and are open on the side surface of the piston main body 34. Further, the second opening hole 43c is formed so as to correspond to the position of the second space 28R and can be connected to the second space 28R in accordance with the position of the piston 22. To be specific, when the piston 22 is located between the second offset position and the neutral position, the second opening hole 43c is connected to the second space 28R (see FIGS. 2 and 4). Further, when the piston 22 moves from the neutral position toward the first offset position, the second opening hole 43c starts being closed by the medium-diameter portion 24c of the second seat member 24R. When the piston 22 is located at the first offset position, the second opening hole 43c is completely closed and is therefore blocked from the second space 28R. On the other hand, the third opening hole 43d is connected to the second space 28R at all times regardless of the position of the piston 22.

Figure 6B:
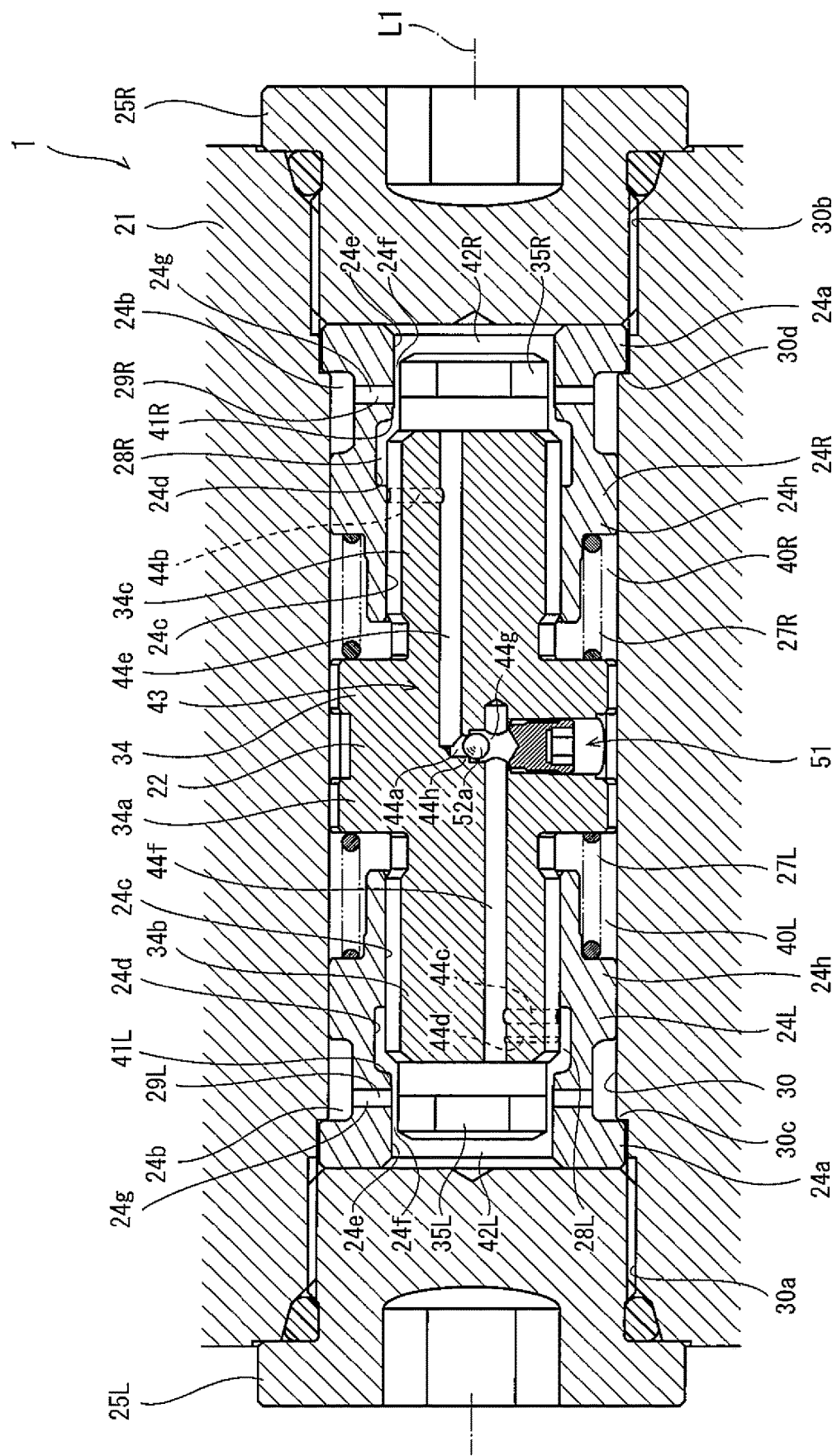
FIG. 6B is a plan sectional view taken along line VIB-VIB of FIG. 5 and showing the swing-back preventing apparatus.

The second communication passage 44 that is one of the two communication passages 43 and 44 is configured as below. To be specific, as shown in FIG. 6B, the second communication passage 44 includes a passage main body 44*a* and three opening holes 44*b* to 44*d*. The passage main body 44*a* is formed in a substantially Z shape on the cutting plane. To be specific, in a plan view of the cutting plane, first and second side portions 44*e* and 44*f* of the passage main body 44*a* are located away from each other at respective front and rear sides, and a middle portion 44*g* of the passage main body 44*a* extends in the front-rear direction to connect the first and second side portions 44*e* and 44*f*. The first and second side portions 44*e* and 44*f* of the passage main body 44*a* respectively extend from the middle portion 44*g* to one end and the other end of the piston main body 34. The first opening hole 44*b* is connected to the first side portion 44*e*, and the second opening hole 44*c* and the third opening hole 44*d* are connected to the second side portion 44*f*.

The first opening hole 44*b* extends from the first side portion 44*e* in the radial direction and is open on the side surface of the piston main body 34. Further, the first opening hole 44*b* is formed so as to correspond to the position of the second space 28R and can be connected to the second space 28R in accordance with the position of the piston 22. To be specific, when the piston 22 is located between the neutral position and the first offset position, the first opening hole 44*b* is closed by the medium-diameter portion 24*c* of the first seat member 24R and is therefore blocked from the second space 28R (see FIGS. 2 and 3). Further, when the piston 22 moves from the neutral position toward the second offset position, the first opening hole 44*b* starts being connected to the second space 28R. When the piston 22 reaches the vicinity of the second offset position, the first opening hole 44*b* completely opens (see FIG. 4).

The second opening hole 44*c* and the third opening hole 44*d* extend from the second side portion 44*f* in the radial direction and are open on the side surface of the piston main body 34. Further, the second opening hole 44*c* is formed so as to correspond to the position of the first space 28L and can be connected to the first space 28L in accordance with the position of the piston 22. To be specific, when the piston 22 is located between the first offset position and the neutral position, the second opening hole 44*c* is connected to the first space 28L. Further, when the piston 22 moves from the neutral position toward the second offset position, the second opening hole 44*c* starts being closed by the medium-diameter portion 24*c* of the first seat member 24L. When the piston 22 is located at the first offset position, the second opening hole 44*c* is completely closed and is therefore blocked from the first space 28L. On the other hand, the third opening hole 44*d* is connected to the first space 28L at all times regardless of the position of the piston 22.

Figure 7:
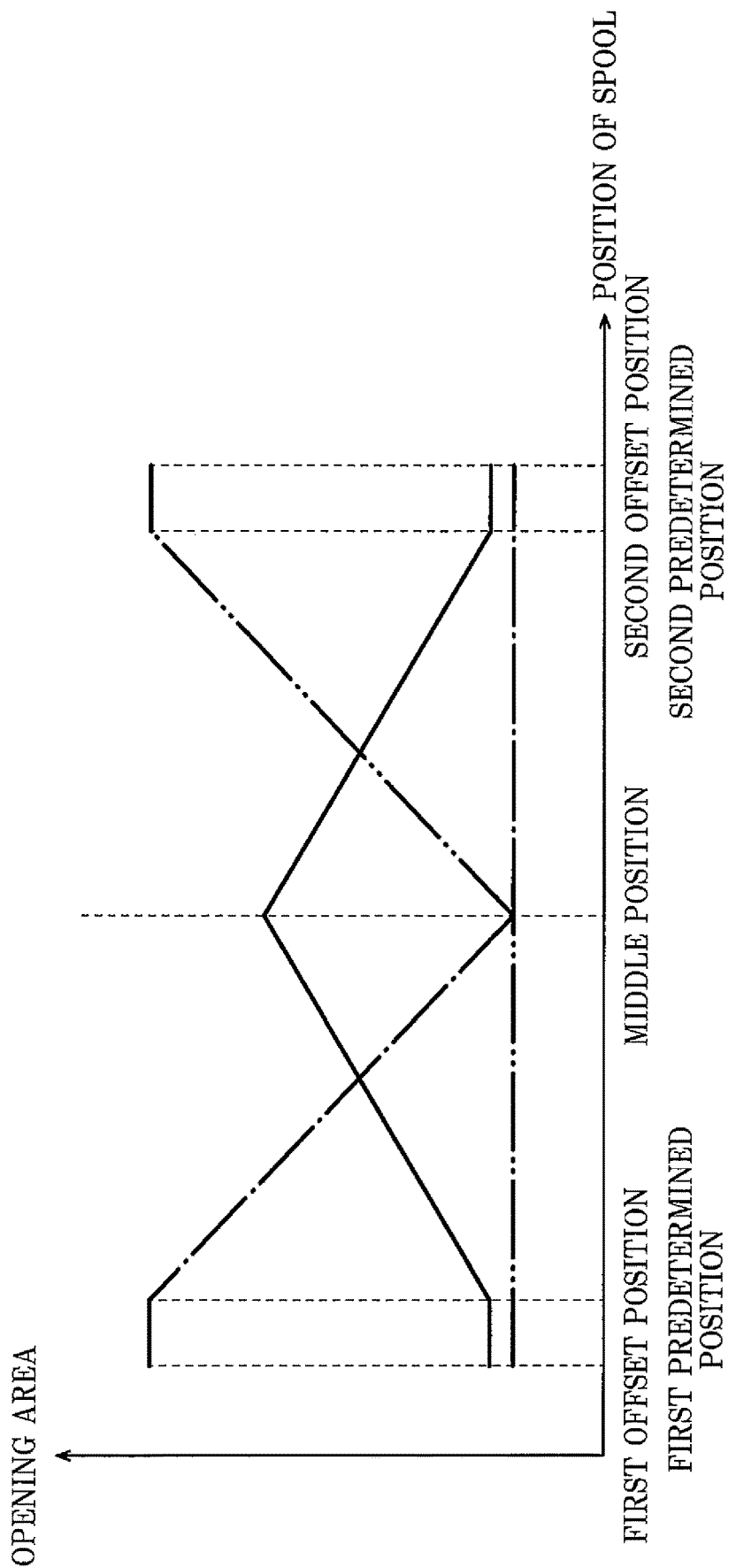
FIG. 7 is a graph showing a relation between an opening degree of an opening of a communication passage formed at the piston of the swing-back preventing apparatus and a position of the piston.

Opening areas of the two communication passages 43 and 44 having such shapes change in accordance with the position of the piston 22 as shown in a graph of FIG. 7. In FIG. 7, a vertical axis shows the opening area, and a horizontal axis shows the position of the piston 22. Further, a one-dot chain line shows the opening area of the first communication passage 43, and a two-dot chain line shows the opening area of the second communication passage 44. When the piston 22 is located in a range from the first offset position to a first predetermined position close to the first offset position, the opening area of the first communication passage 43 is a maximum value, i.e., is constant. As the piston 22 moves from the first predetermined position to the neutral position, the opening area of the first communication passage 43 decreases. When the piston 22 is located at the neutral position, the opening area of the first communication passage 43 becomes zero. When the piston 22 is located in a range from the neutral position to the first offset position, the opening area of the first communication passage 43 is zero regardless of the position of the piston 22. To be specific, when the piston 22 is located at the first offset position side of the neutral position, the first communication passage 43 is connected to the first space 28L. When the piston 22 is located in a range from the neutral position to the second offset position, the first communication passage 43 is blocked from the first space 28L.

The characteristic of the opening area of the second communication passage 44 is opposite to the characteristic of the opening area of the first communication passage 43. To be specific, when the piston 22 is located in a range from the second offset position to a second predetermined position close to the second offset position, the opening area of the second communication passage 44 is a maximum value, i.e., is constant. As the piston 22 moves from the second predetermined position to the neutral position, the opening area of the second communication passage 44 decreases. When the piston 22 is located at the neutral position, the opening area of the second communication passage 44 becomes zero. When the piston 22 is located in a range from the neutral position to the second offset position, the opening area of the second communication passage 44 is zero regardless of the position of the piston 22. To be specific, when the piston 22 is located at the second offset position side of the neutral position, the second communication passage 44 is connected to the second space 28R. When the piston 2 is located in a range from the neutral position to the first offset position, the second communication passage 44 is blocked from the second space 28R. As shown in FIG. 5, check valves 51 and 52 are interposed on the respective communication passages 43 and 44 having the above functions.

The first check valve 51 that is one of the two check valves 51 and 52 as one example of first and second blocking mechanisms is arranged at the middle portion 43*g* of the first communication passage 43 and is configured as below, for example. To be specific, a region of the middle portion 43*g* which region is connected to the second side portion 43*f* of the first communication passage 43 is larger in diameter than a region of the middle portion 43*g* which region is connected to the first side portion 43*e* of the first communication passage 43. The middle portion 43*g* includes a level-difference portion 43*h* at a middle thereof. The first check valve 51 includes a spherical member 51*a*. The spherical member 51*a* is arranged at the region of the middle portion 43*g* which region is connected to the second side portion 43*f* The spherical member 51*a* is seated on the level-difference portion 43*h* and moves in accordance with the differential pressure between the liquid pressure of the first side portion 43*e* and the liquid pressure of the second side portion 43*f*. To be specific, when the liquid pressure of the second side portion 43*f* is lower than the liquid pressure of the first side portion 43*e*, the spherical member 51*a* separates from the level-difference portion 43*h*, and therefore, the first side portion 43*e* and the second side portion 43*f* communicate with each other. In contrast, when the liquid pressure of the first side portion 43*e* is lower than the liquid pressure of the second side portion 43*f*, the spherical member 51*a* is seated on the level-difference portion 43*h*, and therefore, blocks communication between the first side portion 43*e* and the second side portion 43*f* On this account, the first check valve 51 allows the flow of the operating liquid from the first opening hole 43*b* to the second and third opening holes 43*c* and 43*d* and blocks the flow of the operating liquid in its opposite direction.

The second check valve 52 that is the other of the two check valves 51 and 52 is configured in the same manner as the first check valve 51. To be specific, the middle portion 44g of the second communication passage 44 includes a level-difference portion 44h at a middle thereof. A region of the middle portion 44g which region is connected to the second side portion 44f is larger in diameter than a region of the middle portion 44g which region is connected to the first side portion 44e. When a spherical member 52a of the second check valve 52 is seated on the level-difference portion 44h, the spherical member 52a is located at the region of the middle portion 44g which region is connected to the second side portion 44f. Further, when the liquid pressure of the second side portion 44f is higher than the liquid pressure of the first side portion 44e, the spherical member 52a separates from the level-difference portion 44h, and therefore, the first side portion 44e and the second side portion 44f communicate with each other. In contrast, when the liquid pressure of the first side portion 44e is higher than the liquid pressure of the second side portion 44f, the spherical member 52a is seated on the level-difference portion 44h, and therefore, blocks communication between the first side portion 44e and the second side portion 44f. On this account, the second check valve 52 allows the flow of the operating liquid from the first opening hole 44b to the second and third opening holes 44b and 44c and blocks the flow of the operating liquid in its opposite direction.

Operations of Swing-Back Preventing Apparatus

Figure 8:
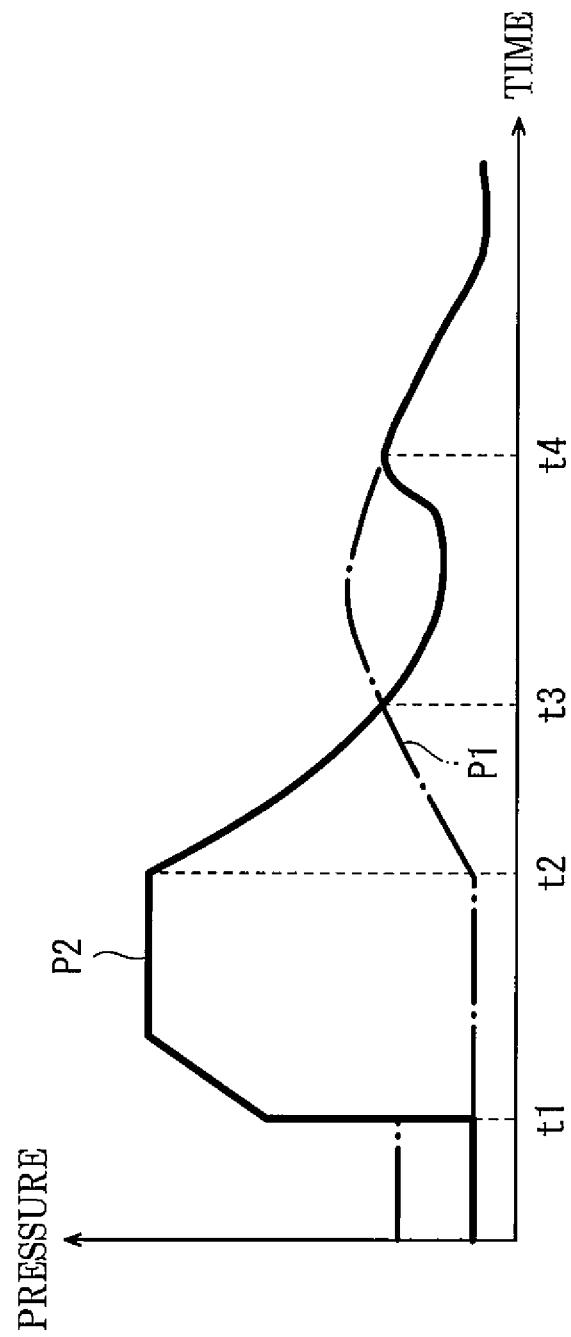
FIG. 8 is a graph showing time-lapse changes of liquid pressures of ports of the swing-back preventing apparatus when braking a hydraulic motor.
Figure 9:
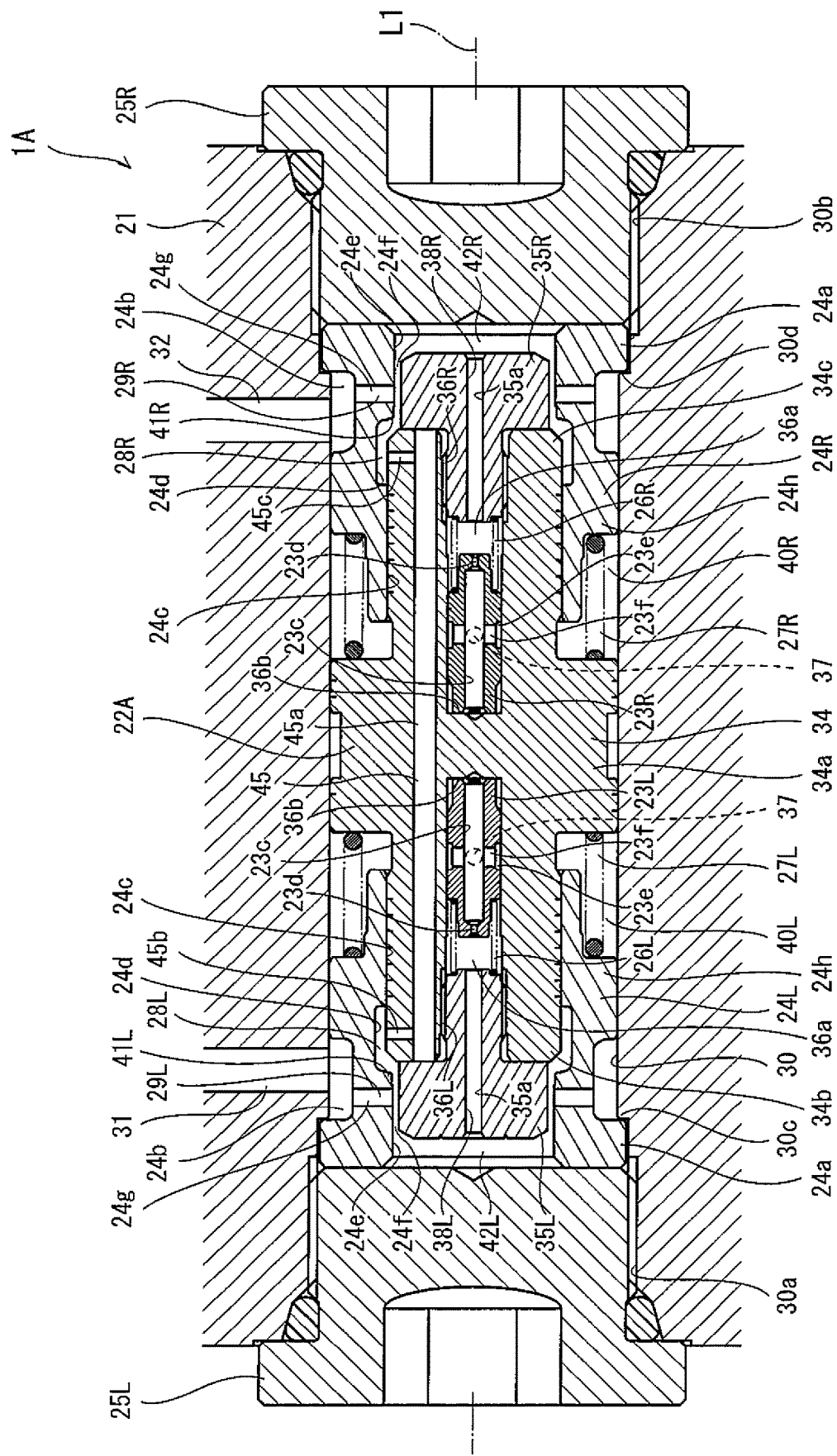
FIG. 9 is a sectional view showing the configuration of the swing-back preventing apparatus according to Embodiment 2 of the present invention.

Hereinafter, the function of the swing-back preventing apparatus 1 will be described also with reference to a graph of FIG. 8. In FIG. 8, a vertical axis shows pressure, and a horizontal axis shows time. Further, a solid line shows the liquid pressure P2 of the second port 32, and a one-dot chain line shows the liquid pressure P1 of the first port 31. When braking pressure acts in the hydraulic driving system 4 shown in FIG. 1, the swing-back preventing apparatus 1 configured as above operates as below. When stopping the hydraulic motor 3, the liquid passages 16L and 16R are blocked from the hydraulic pump 11 and the tank 15 by the direction control valve 12 in the hydraulic driving system 4 (see a time t1 in FIG. 8). For example, when the hydraulic motor 3 to be stopped is rotating in the normal direction, and the liquid passages 16L and 16R are blocked from the hydraulic pump 11 and the tank 15, the pumping of the hydraulic motor 3 occurs by the inertial force of the turning body 2, and the operating liquid is sucked from the tank 15 through the check valve 14L to the first supply/discharge port 3L. The sucked operating liquid is discharged from the second supply/discharge port 3R to the liquid passage 16R. With this, the liquid pressure of the liquid passage 16R increases, and then, the operating liquid is discharged through the relief valve 13R to the tank 15. With this, the pressure difference is generated between the two ports 3L and 3R of the hydraulic motor 3, and the hydraulic motor 3 is braked by the pressure difference.

Further, by the generation of the pressure difference between the two ports 3L and 3R, the pressure difference is generated also between the first port 31 and the second port 32 which are connected to the two ports 3L and 3R, respectively. Specifically, the liquid pressure P2 of the second port 32 becomes higher than the liquid pressure P1 of the first port 31. With this, the piston 22 moves to the first offset position and is then seated on the first seat portion 41L as shown in FIG. 3. With this, communication between the first port 31 and the first space 28L is blocked. At this time, the first check valve 51 at the first communication passage 43 is closed, and the first opening hole 44b of the second communication passage 44 is closed by the second seat portion 41R. Therefore, the two communication passages 43 and 44 cannot communicate with each other.

The speed of the hydraulic pump 11 lowers by the braking operation, and then, when the hydraulic motor 3 stops, the discharge pressure of the hydraulic pump 11 becomes less than the set pressure, and therefore, the relief valve 13R is closed. At this time, the pressure of the second port 32 becomes a value close to the set pressure, and the pressure of the first port 31 becomes a value close to the tank pressure. Therefore, the pressure difference exists between the two ports 31 and 32. After the hydraulic motor 3 stops, the hydraulic motor 3 starts a reversely rotating operation to suck the operating liquid from the liquid passage 16R and discharge the operating liquid to the liquid passage 16L (see a time t2 in FIG. 8). With this, the liquid pressure P1 of the first port 31 increases, and the liquid pressure P2 of the second port 32 starts decreasing. After that, when a differential pressure |P1−P2| between the liquid pressure P1 and the liquid pressure P2 becomes a predetermined value or less, the piston 22 starts moving from the second offset position to the neutral position. With this, the piston 22 separates from the first seat portion 41L, and the first port 31 and the first space 28L communicate with each other.

Immediately after the first port 31 and the first space 28L communicate with each other, the first opening hole 43b of the first communication passage 43 faces the first space 28L. However, since the liquid pressure of the first port 31 is equal to or less than the liquid pressure of the second port 32, the first communication passage 43 is being closed by the first check valve 51. On the other hand, the first opening hole 44b of the second communication passage 44 is being closed by the second seat portion 41R, and the second communication passage 44 is also being closed. In this state, the piston 22 moves from the first offset position to the neutral position. The damping chambers 40L and 40R are filled with the operating liquid, and the movement speed of the piton 22 is determined by the amounts of operating liquid supplied to and discharged from the damping chambers 40L and 40R. The flow rate of the operating liquid discharged from the first damping chamber 40R is adjusted by the first spool 23R, and the flow rate of the operating liquid supplied to the second damping chamber 40L is adjusted by the second spool 23L. Each of the spools 23L and 23R supplies or discharges the operating liquid at a fixed flow rate regardless of the magnitudes of the liquid pressures P1 and P2. Therefore, the piston 22 slowly moves to the neutral position.

While the piston 22 is moving toward the neutral position, the liquid pressure P1 of the first port 31 increases and the liquid pressure P2 of the second port 32 decreases by the rotation of the hydraulic motor 3. Since the piston 22 slowly moves to the neutral position, the magnitude of the liquid pressure P1 of the first port 31 and the magnitude of the liquid pressure P2 of the second port 32 are reversed before the piston 22 reaches the neutral position (see a time t3 in FIG. 8). With this, the first check valve 51 opens, and the operating liquid of the first space 28L flows through the first communication passage 43 to the second space 28R. As above, since the two spaces 28L and 28R communicate with each other by the first communication passage 43, the differential pressure |P1−P2| becomes zero soon. Therefore, since the liquid pressure P1 of the first port 31 becomes higher than the liquid pressure P2 of the second port 32, the hydraulic motor 3 reversely rotates in the normal direction for the second time, but the hydraulic motor 3 can be stopped without reversely rotating for the third time. To be specific, the occurrence of the swing-back phenomenon can be suppressed by the swing-back preventing apparatus 1.

Further, when braking the hydraulic motor 3 that is rotating in the reverse direction at a fixed speed, the liquid pressure P1 of the first port 31 becomes higher than the liquid pressure P2 of the second port 32, and the piston 22 moves to the second offset position and is then seated on the second seat portion 41R as shown in FIG. 4. With this, communication between the second port 32 and the second space 28R is blocked. After that, when the braking operation is continued, the hydraulic motor 3 stops soon, and the relief valve 13R is closed. With this, the hydraulic motor 3 starts reversely rotating in the normal direction. Thus, the liquid pressure P2 of the second port 32 increases, and the liquid pressure P1 of the first port 31 decreases, and therefore, the differential pressure |P1−P2| becomes low. When the differential pressure |P1−P2| becomes the predetermined value or less, the piston 22 separates from the second seat portion 41R, and the second port 32 and the second space 28R communicate with each other. Even after the second port 32 and the second space 28R communicate with each other, the liquid pressure P2 of the second port 32 continuously increases, and the liquid pressure P1 of the first port 31 continuously decreases. When the magnitude of the liquid pressure P2 of the second port 32 and the magnitude of the liquid pressure P1 of the first port 31 are reversed, the second check valve 52 opens, and the operating liquid of the second space 28R flows through the second communication passage 44 to the first space 28L. As above, since the two spaces 28L and 28R communicate with each other by the second communication passage 44, the differential pressure |P1−P2| can be made to become zero. Although the hydraulic motor 3 reversely rotates in the reverse direction for the second time, the hydraulic motor 3 can be stopped without reversely rotating for the third time. To be specific, the occurrence of the swing-back phenomenon can be suppressed by the swing-back preventing apparatus 1.

According to the swing-back preventing apparatus 1 configured as above, when the magnitude of the liquid pressure of the first port 31 and the magnitude of the liquid pressure of the second port 32 are reversed, and the hydraulic motor 3 performs the reversely rotating operation for the second time, the first port 31 and the second port 32 communicate with each other for the first time by the communication passages 43 and 44. With this, immediately after the magnitudes of the pressures of the two ports 31 and 32 are reversed, the two ports 31 and 32 can be made to communicate with each other. Therefore, the differential pressure |P1−P2| can be made to become zero more quickly, and the magnitude of the swing-back in the reversely rotating operation for the second time can be suppressed.

According to the swing-back preventing apparatus 1 that is operating, the opening areas of the communication passages 43 and 44 decrease as the piston 22 moves from each offset position to the neutral position. Therefore, the operating liquid can be made to flow between the two ports 31 and 32 at a high flow rate from immediately after the magnitude of the liquid pressure P1 of the first port 31 and the magnitude of the liquid pressure P2 of the second port 32 are reversed. With this, as compared to a case where the opening areas increase as the piston 22 moves, the differential pressure |P1−P2| can be made to become zero more quickly, and the swing-back in the reversely rotating operation for the second time can be stopped more quickly.

Further, according to the swing-back preventing apparatus 1, after the differential pressure |P1−P2| between the liquid pressures of the two ports 31 and 32 becomes zero, the piston 22 is made to return to the neutral position by the pair of springs 27L and 27R. At the neutral position, the first opening holes 43b and 44b of the communication passages 43 and 44 are respectively closed by the seat members 24L and 24R, i.e., both the communication passages 44 and 43 are closed. To be specific, in the swing-back preventing apparatus 1, when the hydraulic motor 3 is in a stop state, the piston 22 is made to return to the neutral position. With this, the flow of the operating liquid between the two ports 31 and 32 can be suppressed. Thus, even when undesired load acts on the hydraulic motor 3, the rotation of the hydraulic motor 3 can be suppressed.

The swing-back preventing apparatus 1 configured as above is assembled as below. To be specific, the piston 22 in which the pair of spools 23L and 23R are incorporated is inserted into the piston hole 30 of the housing 21, and the springs 27L and 27R are respectively inserted through the openings 30a and 30b and externally attached to the piston 22. Further, the pair of seat members 24L and 24R are respectively inserted into the openings 30a and 30b of the piston hole 30 so as to be externally attached to both respective end portions of the piston 22 (more specifically, the respective axial end side portions 34b and 34c of the piston main body 34). Finally, the plugs 25L and 25R are threadedly engaged with the openings 30a and 30b, respectively. With this, the spring 27L is sandwiched by the piston 22 and the seat member 24L in a compressed state, and the spring 27R is sandwiched by the piston 22 and the seat member 24R in a compressed state. Thus, the swing-back preventing apparatus 1 described as above is assembled. As above, the swing-back preventing apparatus 1 can be configured to be assembled in such a manner that: the communication passages 43 and 44 connecting the two spaces 28L and 28R are formed in the piston 22; and with this, the members 24L, 24R, 27L, and 27R are externally attached to the single piston 22 inserted in the piston hole 30.

The conventional valve device (i.e., the valve device described in PTL 1) is configured to be assembled in such a manner that: left and right cartridge-type valves each having an independent structure are inserted through left and right openings, respectively; and plugs are threadedly engaged with the respective openings. Since the cartridge-type valves are inserted, coaxiality and the like of the cartridge-type valves need to be adjusted, and therefore, assembling the conventional valve device is complex. On the other hand, since the swing-back preventing apparatus 1 is configured to be assembled in such a manner that the single piston 22 is inserted into the piston hole 30, it is unnecessary to adjust the coaxiality. Therefore, the number of parts of the swing-back preventing apparatus 1 can be made smaller than that of the conventional valve device, and the ease of assembling of the swing-back preventing apparatus 1 can be improved.

Embodiment 2

The swing-back preventing apparatus 1A of Embodiment 2 is similar in configuration to the swing-back preventing apparatus 1 of Embodiment 1. Therefore, components of the swing-back preventing apparatus 1A of Embodiment 2 which are different from the components of the swing-back preventing apparatus 1 of Embodiment 1 will be mainly described. The same reference signs are used for the same components, and a repetition of the same explanation is avoided.

In the swing-back preventing apparatus 1A of Embodiment 2, a communication passage 45 is formed at a piston 22A. The communication passage 45 is a passage extending along an axis (i.e., the axis L1) of the piston 22A and includes a passage main body 45a and two opening holes 45*b* and 45*c*. The passage main body 45*a* extends from one end to the other end of the piston main body 34. Both ends of the passage main body 45*a* are closed by the respective plugs 35L and 35R. The first opening hole 45*b* is connected in the vicinity of one end of the passage main body 45*a*, and the second opening hole 45*c* is connected in the vicinity of the other end of the passage main body 45*a*.

The first opening hole 45*b* is open on the side surface of the piston main body 34 and is formed so as to correspond to the first space 28L. To be specific, when the piston 22A is located at each of the first offset position and the neutral position, the first opening hole 45*b* is connected to the first space 28L. As the piston 22A moves from the neutral position to the second offset position, the opening area of the first opening hole 45*b* decreases. When the piston 22A reaches the vicinity of the second offset position, the first opening hole 45*b* is closed by the second seat member 24R. The first opening hole 45*b* maintains a closed state until the piston 22A reaches the second offset position.

The second opening hole 45*c* is open on the side surface of the piston main body 34 and is formed so as to correspond to the second space 28R. To be specific, when the piston 22A is located at each of the second offset position and the neutral position, the second opening hole 45*c* is connected to the second space 28R. As the piston 22A moves from the neutral position to the first offset position, the opening area of the second opening hole 45*c* decreases. When the piston 22A reaches the vicinity of the first offset position, the second opening hole 45*c* is closed by the first seat member 24L. The second opening hole 45*c* maintains a closed state until the piston 22A reaches the first offset position.

The opening area of the communication passage 45 having such shape changes in accordance with the position of the piston 22 as shown in FIG. 7. To be specific, as shown by a solid line in FIG. 7, when the piston 22A moves from each of the first predetermined position and the second predetermined position to a middle position, the opening area of the communication passage 45 increases. When the piston 22A reaches the middle position, the opening area of the communication passage 45 becomes maximum.

As with the swing-back preventing apparatus 1 of Embodiment 1, the swing-back preventing apparatus 1A configured as above can suppress the swing-back phenomenon. For example, when the liquid pressure P2 of the second port 32 becomes higher than the liquid pressure P1 of the first port 31, the piston 22A moves to the first offset position and is then seated on the first seat portion 41L. In this state, when the hydraulic motor 3 starts rotating reversely in the normal direction, and the differential pressure |P1−P2| becomes the predetermined value or less, the piston 22A separates from the first seat portion 41L, and the first port 31 and the first space 28L communicate with each other. After that, when the piston 22A moves to the second predetermined position, the second opening hole 45*c* of the communication passage 45 starts opening, and the operating liquid of the first space 28L flows through the communication passage 45 to the first space 28L. After that, the hydraulic motor 3 reversely rotates by the pressure difference between the two ports 31 and 32. However, since the two spaces 28L and 28R communicate with the communication passage 45, the pressure difference can be made to become zero. With this, the hydraulic motor 3 can be stopped without reversely rotating for the third time, and the occurrence of the swing-back phenomenon can be suppressed.

The swing-back preventing apparatus 1A configured as above can be assembled by the same method as the swing-back preventing apparatus 1 of Embodiment 1. Therefore, the number of parts of the swing-back preventing apparatus 1A can be made smaller than that of the conventional valve device, and the ease of assembling of the swing-back preventing apparatus 1A can be improved.

Other Embodiments

The hydraulic actuator is not limited to the above-described hydraulic motor 3 and may be a double acting type hydraulic cylinder and is only required to be a hydraulic actuator which includes two ports and can switch the operating direction by changing supply and discharge of the operating liquid to and from the respective ports. Further, the hydraulic actuator is not limited to a hydraulic actuator mounted on a construction machine and may be a hydraulic actuator used in the field of ships, aircrafts, vehicles, medical care, and the like other than construction machines.

In the swing-back preventing apparatus 1 of Embodiment 1, the sectional areas of the two communication passages 43 and 44 are substantially equal to each other but do not necessarily have to be equal to each other. When the sectional areas of the two communication passages 43 and 44 are made different from each other, the change in the opening area can be changed for each of the communication passages 43 and 44. Further, the check valves 51 and 52 are adopted as the blocking mechanisms configured to block the flow in the corresponding communication passages 43 and 44. However, the present invention is not limited to this, and a shuttle valve may be adopted.

REFERENCE SIGNS LIST 1 swing-back preventing apparatus
1A swing-back preventing apparatus
3 hydraulic motor (hydraulic actuator)
3L first supply/discharge port
3R second supply/discharge port
21 housing
22, 22A piston
23R first spool (flow rate control spool)
23L second spool (flow rate control spool)
27L spring (biasing member)
27R spring (biasing member)
28L first space
28R second space
30 piston hole
31 first port
32 second port
40R first damping chamber
40L second damping chamber
43 first communication passage
44 second communication passage
45 communication passage
51 first check valve (first blocking mechanism)
52 second check valve (second blocking mechanism)

The invention claimed is:
1. A swing-back preventing apparatus comprising:
a housing including a first port, a second port, and a piston hole, the first port being connected to a first supply/discharge port of a hydraulic actuator configured to switch an operating direction by changing supply and discharge of an operating liquid to and from the first supply/discharge port and a second supply/discharge port of the hydraulic actuator, the second port being connected to the second supply/discharge port, the piston hole being connected to the first port and the second port;

a piston configured to receive a liquid pressure of the first port and a liquid pressure of the second port such that these liquid pressures act against each other, the piston being inserted in the piston hole so as to be movable to a position corresponding to a differential pressure between the liquid pressure of the first port and the liquid pressure of the second port, the piston moving from a neutral position to a first offset position when the liquid pressure of the second port is higher than the liquid pressure of the first port, the piston moving from the neutral position to a second offset position when the liquid pressure of the first port is higher than the liquid pressure of the second port; and a pair of biasing members configured to act against the respective liquid pressures of the first and second ports and bias the piston to make the piston return to the neutral position, wherein:

the piston includes a pair of communication passages that are communicable with first and second spaces facing the piston;

when the piston is located at the first offset position, the first space is blocked from the first port;

when the piston separates from the first offset position, the first space is connected to the first port;

when the piston is located at the second offset position, the second space is blocked from the second port;

when the piston separates from the second offset position, the second space is connected to the second port;

when the piston is located at a position on the first offset position side of the neutral position, a first communication passage that is one of the pair of communication passages is connected to the first space;

when the piston is located in a range from the neutral position to the second offset position, the first communication passage is blocked from the first space;

when the piston is located at a position on the second offset position side of the neutral position, a second communication passage that is the other of the pair of communication passages is connected to the second space; and when the piston is located in a range from the neutral position to the first offset position, the second communication passage is blocked from the second space.

2. The swing-back preventing apparatus according to claim 1, further comprising:

a first blocking mechanism configured to allow flow of the operating liquid in the first communication passage from the first space side to the second space side and stop flow of the operating liquid in the first communication passage from the second space side to the first space side; and a second blocking mechanism configured to allow flow of the operating liquid in the second communication passage from the second space side to the first space side and stop flow of the operating liquid in the second communication passage from the first space side to the second space side.

3. The swing-back preventing apparatus according to claim 2, wherein the piston is configured such that:

an opening area of the first communication passage decreases as the piston moves from the second offset position to the neutral position; and an opening area of the second communication passage decreases as the piston moves from the first offset position to the neutral position.

4. The swing-back preventing apparatus according to claim 3, further comprising a pair of flow rate control spools configured to control flow rates of the operating liquid supplied to and discharged from a damping chamber, the damping chamber being formed between the housing and the piston and configured to adjust a movement speed of the piston by supplying or discharging the operating liquid to or from the first port or the second port in accordance with a movement of the piston, wherein:

when the piston moves, a first flow rate control spool that is one of the pair of flow rate control spools supplies or discharges the operating liquid to or from the damping chamber at a fixed flow rate regardless of the liquid pressure of the first port; and when the piston moves, a second flow rate control spool that is the other of the pair of flow rate control spools supplies or discharges the operating liquid to or from the damping chamber at a fixed flow rate regardless of the liquid pressure of the second port.

5. The swing-back preventing apparatus according to claim 2, further comprising a pair of flow rate control spools configured to control flow rates of the operating liquid supplied to and discharged from a damping chamber, the damping chamber being formed between the housing and the piston and configured to adjust a movement speed of the piston by supplying or discharging the operating liquid to or from the first port or the second port in accordance with a movement of the piston, wherein:

when the piston moves, a first flow rate control spool that is one of the pair of flow rate control spools supplies or discharges the operating liquid to or from the damping chamber at a fixed flow rate regardless of the liquid pressure of the first port; and when the piston moves, a second flow rate control spool that is the other of the pair of flow rate control spools supplies or discharges the operating liquid to or from the damping chamber at a fixed flow rate regardless of the liquid pressure of the second port.

6. The swing-back preventing apparatus according to claim 1, wherein the piston is configured such that:

an opening area of the first communication passage decreases as the piston moves from the second offset position to the neutral position; and an opening area of the second communication passage decreases as the piston moves from the first offset position to the neutral position.

7. The swing-back preventing apparatus according to claim 6, further comprising a pair of flow rate control spools configured to control flow rates of the operating liquid supplied to and discharged from a damping chamber, the damping chamber being formed between the housing and the piston and configured to adjust a movement speed of the piston by supplying or discharging the operating liquid to or from the first port or the second port in accordance with a movement of the piston, wherein:

when the piston moves, a first flow rate control spool that is one of the pair of flow rate control spools supplies or discharges the operating liquid to or from the damping chamber at a fixed flow rate regardless of the liquid pressure of the first port; and when the piston moves, a second flow rate control spool that is the other of the pair of flow rate control spools supplies or discharges the operating liquid to or from the damping chamber at a fixed flow rate regardless of the liquid pressure of the second port.

8. The swing-back preventing apparatus according to claim 1, further comprising a pair of flow rate control spools configured to control flow rates of the operating liquid supplied to and discharged from a damping chamber, the damping chamber being formed between the housing and the piston and configured to adjust a movement speed of the piston by supplying or discharging the operating liquid to or from the first port or the second port in accordance with a movement of the piston, wherein:
   when the piston moves, a first flow rate control spool that is one of the pair of flow rate control spools supplies or discharges the operating liquid to or from the damping chamber at a fixed flow rate regardless of the liquid pressure of the first port; and
   when the piston moves, a second flow rate control spool that is the other of the pair of flow rate control spools supplies or discharges the operating liquid to or from the damping chamber at a fixed flow rate regardless of the liquid pressure of the second port.

9. A swing-back preventing apparatus comprising:
a housing including a first port, a second port, and a piston hole, the first port being connected to a first supply/discharge port of a hydraulic actuator configured to switch an operating direction by changing supply and discharge of an operating liquid to and from the first supply/discharge port and a second supply/discharge port of the hydraulic actuator, the second port being connected to the second supply/discharge port, the piston hole being connected to the first port and the second port; and a piston configured to receive a liquid pressure of the first port and a liquid pressure of the second port such that these liquid pressures act against each other, the piston being inserted in the piston hole so as to be movable to a position corresponding to a differential pressure between the liquid pressure of the first port and the liquid pressure of the second port, the piston moving from a neutral position to a first offset position when the liquid pressure of the first port is higher than the liquid pressure of the second port, the piston moving from the neutral position to a second offset position when the liquid pressure of the second port is higher than the liquid pressure of the first port, wherein:

the piston includes a communication passage that is communicable with first and second spaces facing the piston;

when the piston is located at the neutral position, the first space is connected to the first port;

when the piston is located at the first offset position, the first space is blocked from the first port;

when the piston is located at the neutral position, the second space is connected to the second port;

when the piston is located at the second offset position, the second space is blocked from the second port; and in the piston, the communication passage changes a communication state with the first port and a communication state with the second port in accordance with a position of the piston.

* * * * *